US006553642B2

(12) United States Patent
Driessen

(10) Patent No.: US 6,553,642 B2
(45) Date of Patent: Apr. 29, 2003

(54) COUPLING METHOD

(75) Inventor: Leo Driessen, Royal Palms (HK)

(73) Assignee: Black & Decker Inc., Newark, DE (US)

(*) Notice: Subject to any disclaimer, the term of this patent is extended or adjusted under 35 U.S.C. 154(b) by 58 days.

(21) Appl. No.: 09/788,249

(22) Filed: Feb. 16, 2001

(65) Prior Publication Data

US 2001/0023525 A1 Sep. 27, 2001

(30) Foreign Application Priority Data

Mar. 10, 2000 (GB) ............................................ 0005821

(51) Int. Cl.[7] ............................ B23P 11/02; E21B 3/00

(52) U.S. Cl. ............................ 29/453; 29/525; 173/29; 173/217

(58) Field of Search .......................... 29/453, 525, 428; 173/29, 217; 403/359.1, 359.6, 360, 363, 375, 381, 383

(56) References Cited

U.S. PATENT DOCUMENTS 3,724,237 A * 4/1973 Wood ......................... 464/177
3,908,139 A * 9/1975 Duncan, Jr. .................. 310/50
4,103,511 A * 8/1978 Kress et al. ................ 464/177
4,125,339 A * 11/1978 Pittinger, Sr. et al. ...... 403/348
4,251,120 A * 2/1981 Wolff ......................... 384/252
RE30,680 E * 7/1981 Kress et al. ................ 464/177
5,941,891 A 8/1999 Walden
6,126,670 A * 10/2000 Walker et al. .............. 606/176
6,170,579 B1 * 1/2001 Wadge ........................ 173/216
6,176,322 B1 * 1/2001 Wadge ........................ 173/217
6,206,107 B1 * 3/2001 Wadge ........................ 173/217
6,263,980 B1 * 7/2001 Wadge ........................ 173/217
6,286,611 B1 * 9/2001 Bone ........................... 173/216
6,357,533 B1 * 3/2002 Buchholz et al. ........... 173/217
6,401,837 B1 * 6/2002 Pan ............................ 173/217
6,446,734 B1 * 9/2002 Williams et al. ............... 173/1

FOREIGN PATENT DOCUMENTS

EP 0899066 3/1999
EP 0906812 4/1999

* cited by examiner

*Primary Examiner*—Gregory Vidovich
*Assistant Examiner*—Essama Omgba
(74) *Attorney, Agent, or Firm*—Bruce S. Shapiro; Michael P. Leary; Charles E. Yocum

(57) ABSTRACT

A first component part (42) for a power tool has a mounting spigot (90) with a channel (239) therein and a second component part (10) of the power tool has a spigot receiving portion (54) with a rib (101) co-operable with the channel. The first component part includes a cylindrical projection with a chamfered edge (250) and the second component part includes a detent. In a first step in coupling the components parts, the channel in the mounting spigot is aligned with the co-operable rib on the spigot receiving portion. Subsequent steps include engaging the further rib of the spigot receiving portion with a channel on a side wall and finally, urging the chamfered edge past the detent.

16 Claims, 15 Drawing Sheets

COUPLING METHOD

The present invention relates to a method of coupling two component parts of a power tool.

Power tools which comprise a plurality of component parts are known, for example, from EP-A-899,063. In this disclosure there is shown a method of coupling a common body to any one of a plurality of heads, each of which heads is able to perform a different function.

A shortcoming with the coupling method disclosed in this arrangement is that very little accurate registration between the body and each head is necessary in order to effect a coupling. This means that some slight mis-alignment between the body and the head could be possible which in turn leads to a reduction in efficiency of the composite tool.

It is therefore an object of the present invention to at least alleviate the abovementioned shortcomings by providing a method of coupling two component parts of a power tool; the first component part having a mounting spigot with at least one channel formed therein and a generally cylindrical projection formed on the mounting spigot, the generally cylindrical projection including a side wall having a chamfered edge and wherein the side wall includes at least one channel parallel to the axis of the generally cylindrical member; the second component part having a spigot-receiving portion including at least one rib co-operable with the at least one channel formed in the mounting spigot, and a generally cylindrical housing member co-operable with the generally cylindrical projection of the first component part, the spigot receiving portion including at least one further rib co-operable with the at least one channel in the side wall of the first component part, the second component part further including a detent, the method comprising the steps of: aligning the at least one channel in the mounting spigot with the at least one co-operable rib on the spigot receiving portion; coupling the housing member with the cylindrical projection; engaging the further at least one rib of the spigot-receiving portion with the at least one channel of the side wall; and urging the chamfered edge past the detent. By provision of this multi-stage coupling process, accurate registration between the two component parts can be achieved and hence an efficiently-operating power tool can be formed.

Preferably, uncoupling of the two component parts is not possible until the detent has been moved clear of the chamfered edge.

Also, the at least one channel formed in the mounting spigot may comprise a plurality of channels.

Preferably the at least one channel formed in the mounting spigot comprises a plurality of channels. Preferably the at least one channel formed in the side wall comprises a plurality of channels. Advantageously the at least one rib of the spigot-receiving portion comprises a plurality of ribs. Advantageously the at least one further rib of the spigot-receiving portion comprises a plurality of further ribs.

In a preferred embodiment the detent comprises a resiliently biased spring.

Also the coupling of the two components may be only possible when the channels are aligned with their respective ribs.

A preferred embodiment to the present invention will now be described, by way of example only, with reference to the accompanying illustrative drawings in which.

Figure 1:
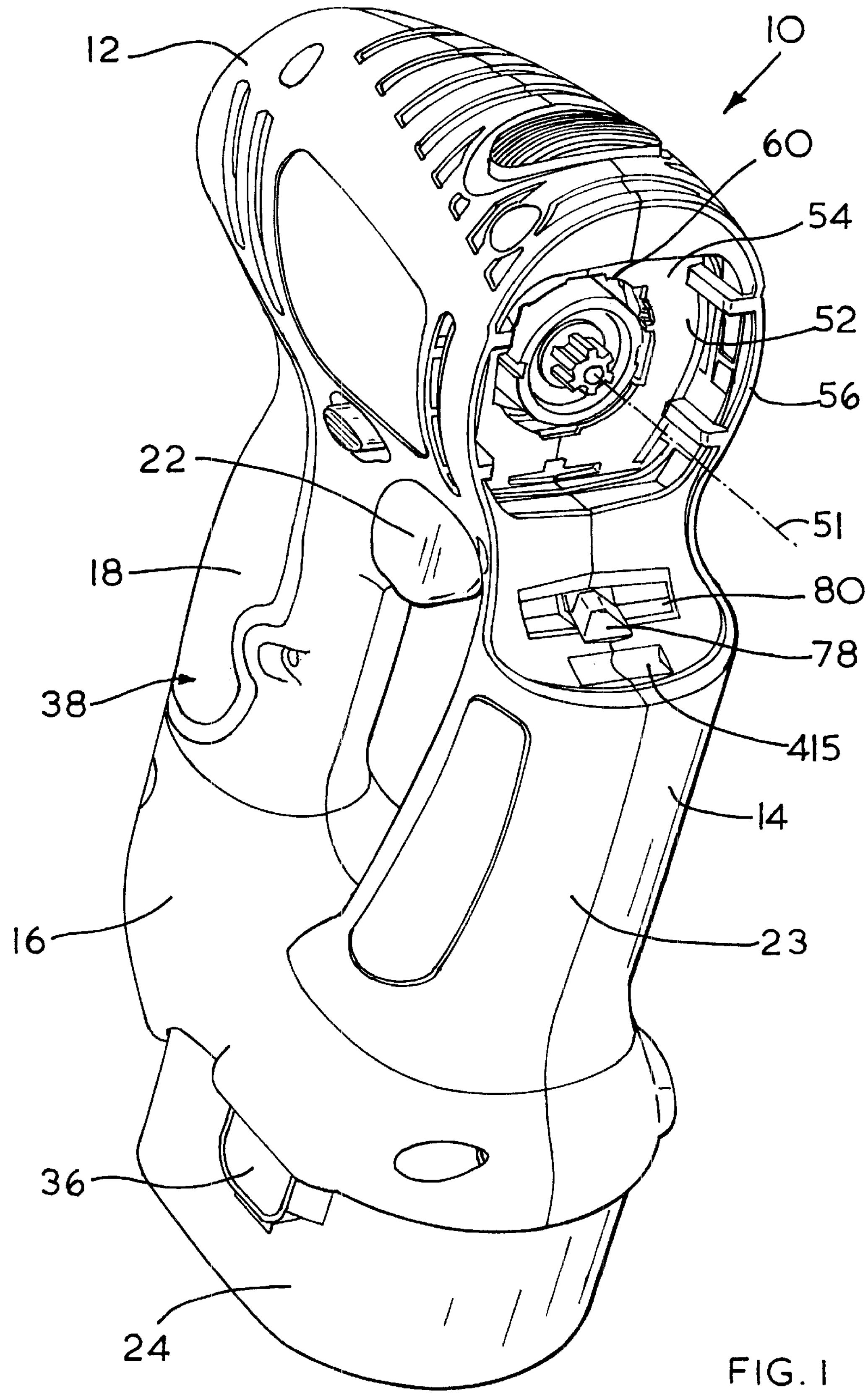
FIG. 1 shows a front perspective view of a body portion of a power tool in accordance with the present invention.
Figure 2:
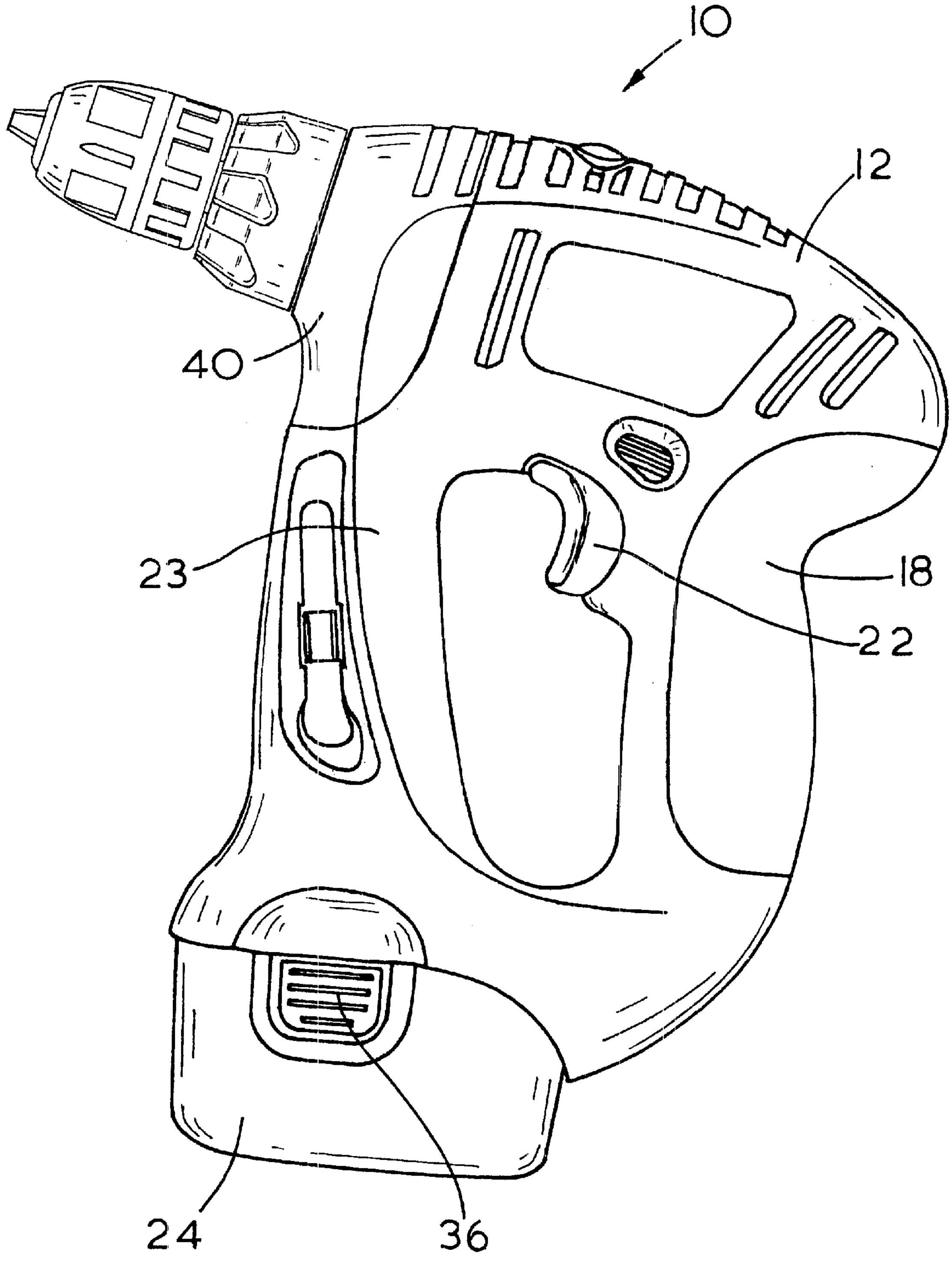
FIG. 2 shows a side elevation of the power tool of FIG. 1 with a drill head attachment.
Figure 2A:
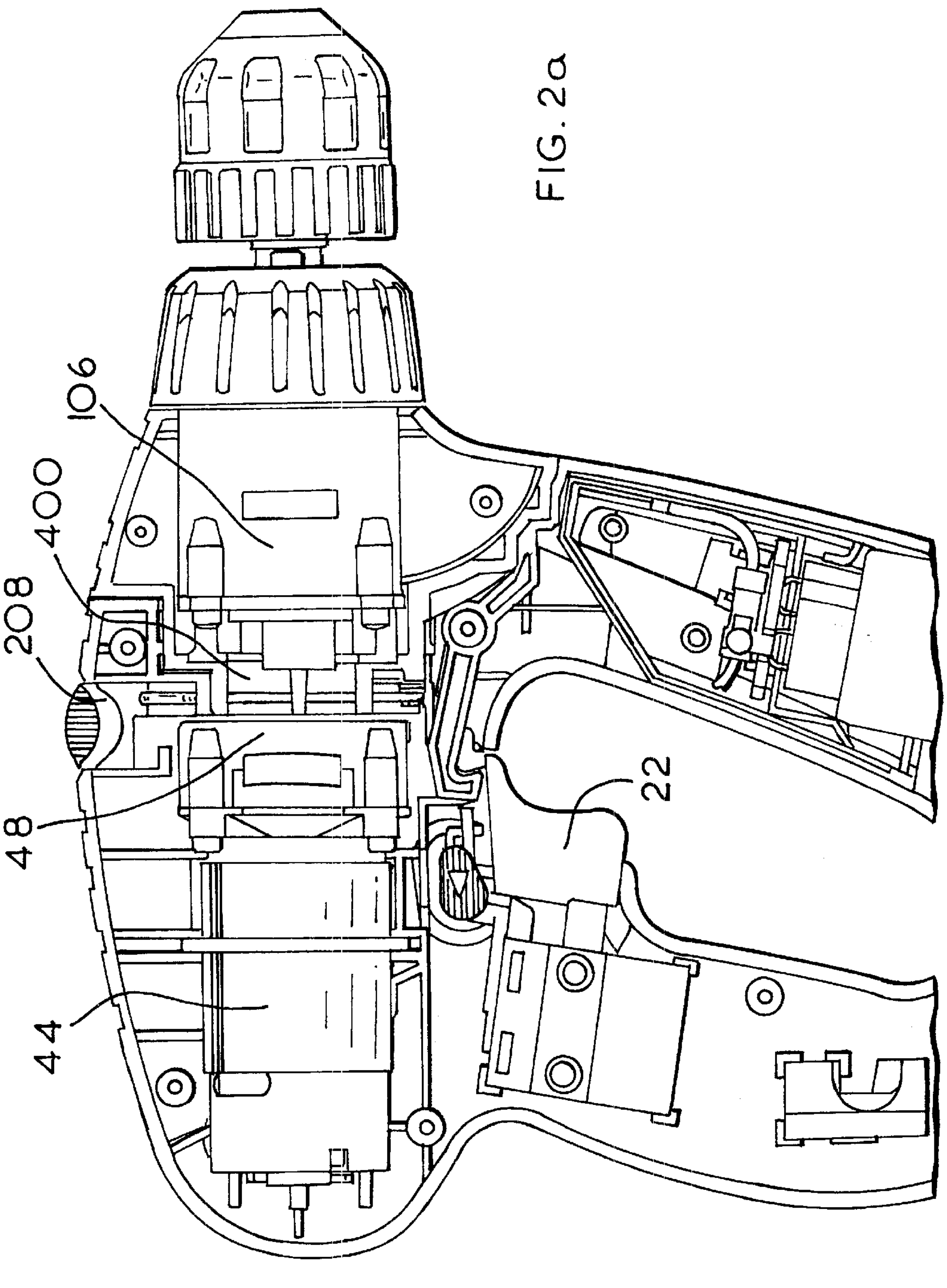
Figure 3:
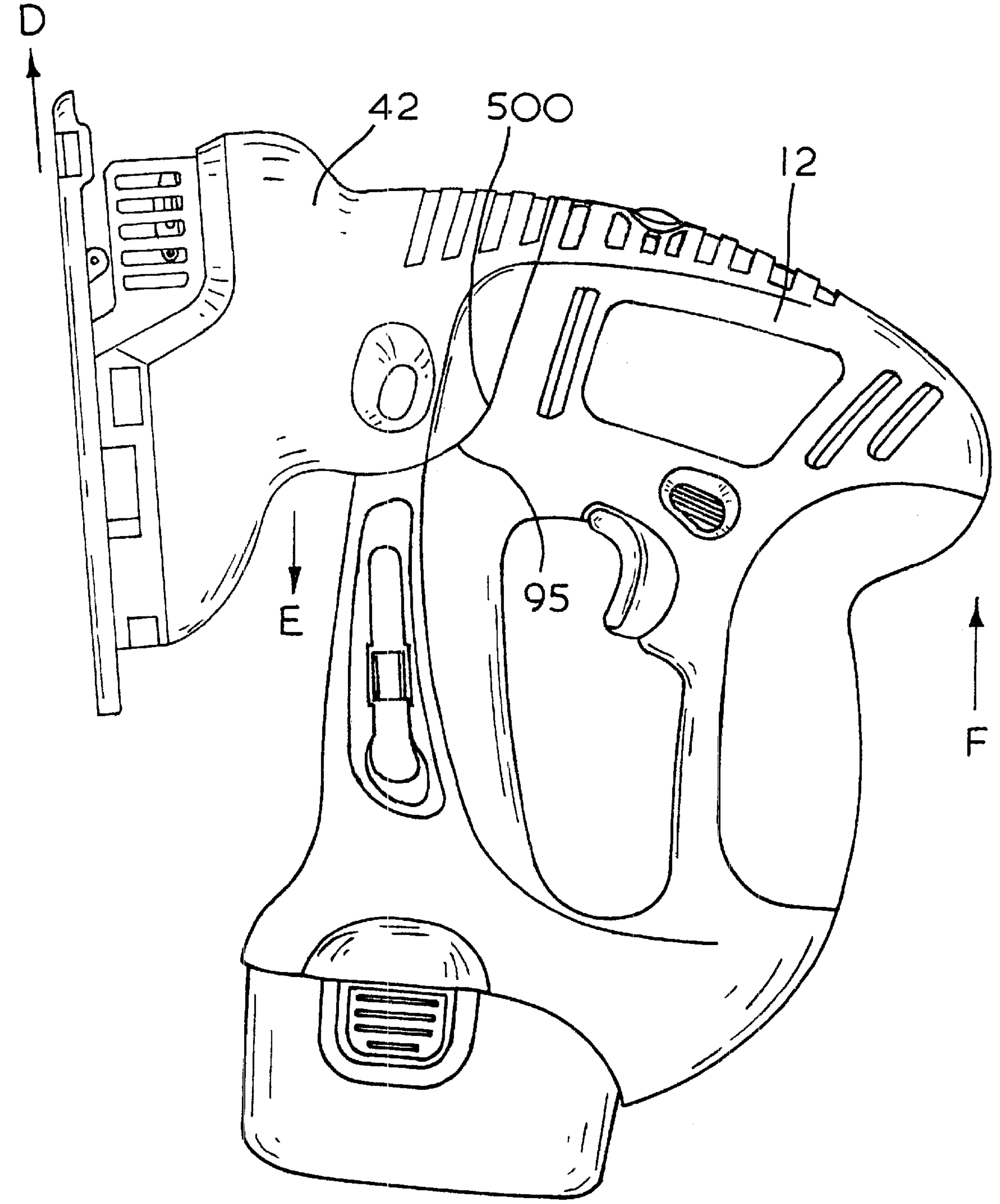
Figure 4:
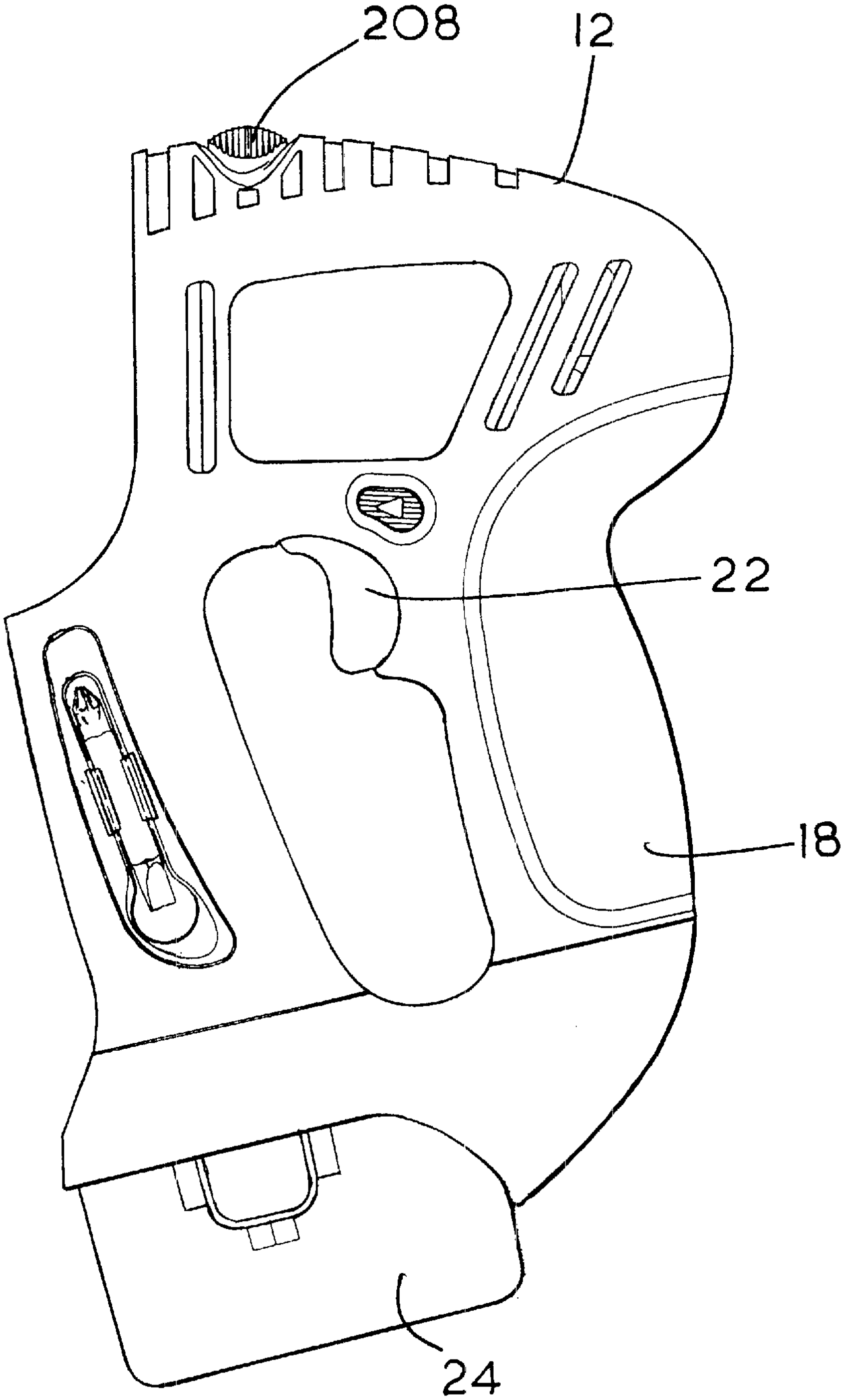
Figure 5A:
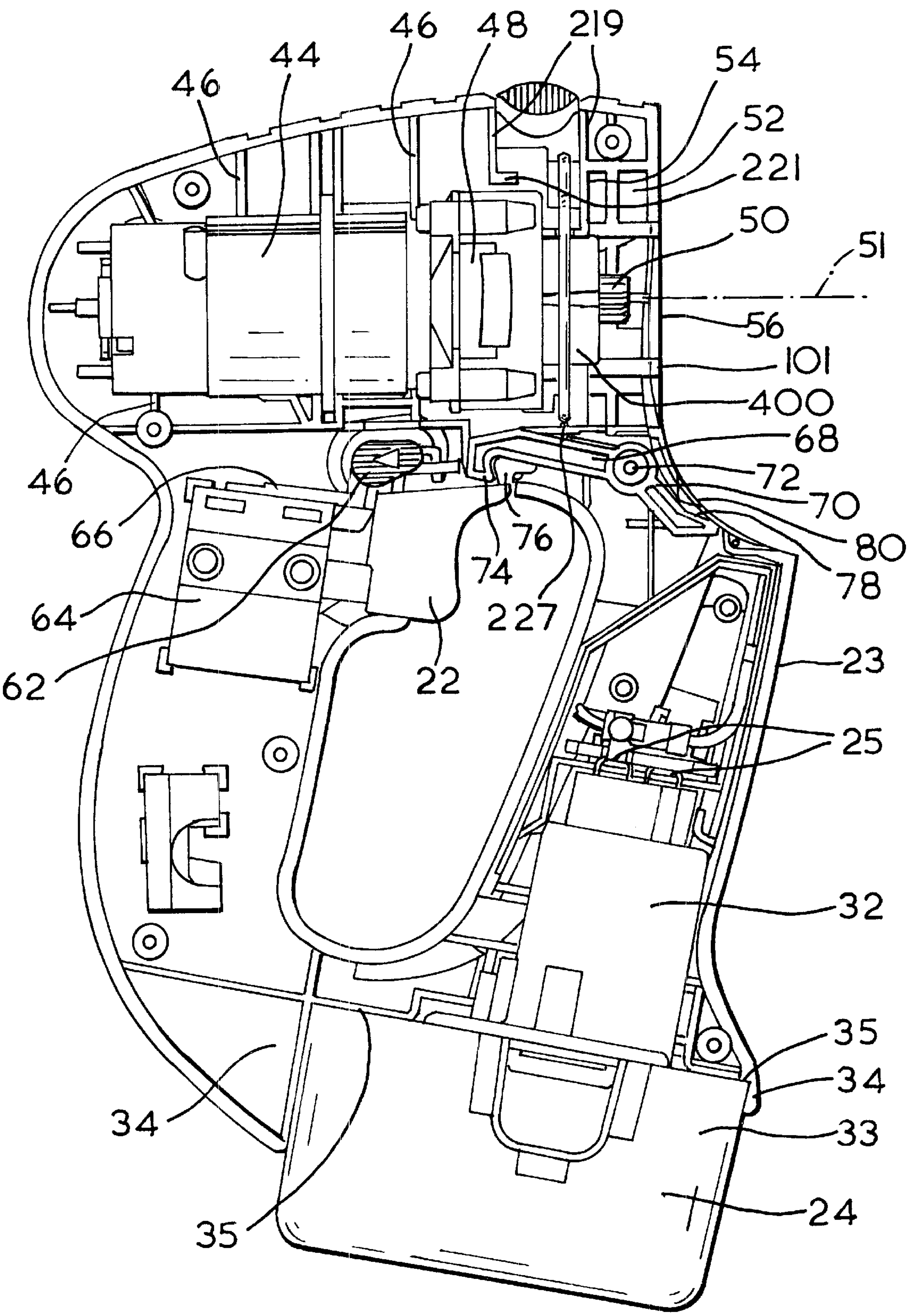
Figure 5B:
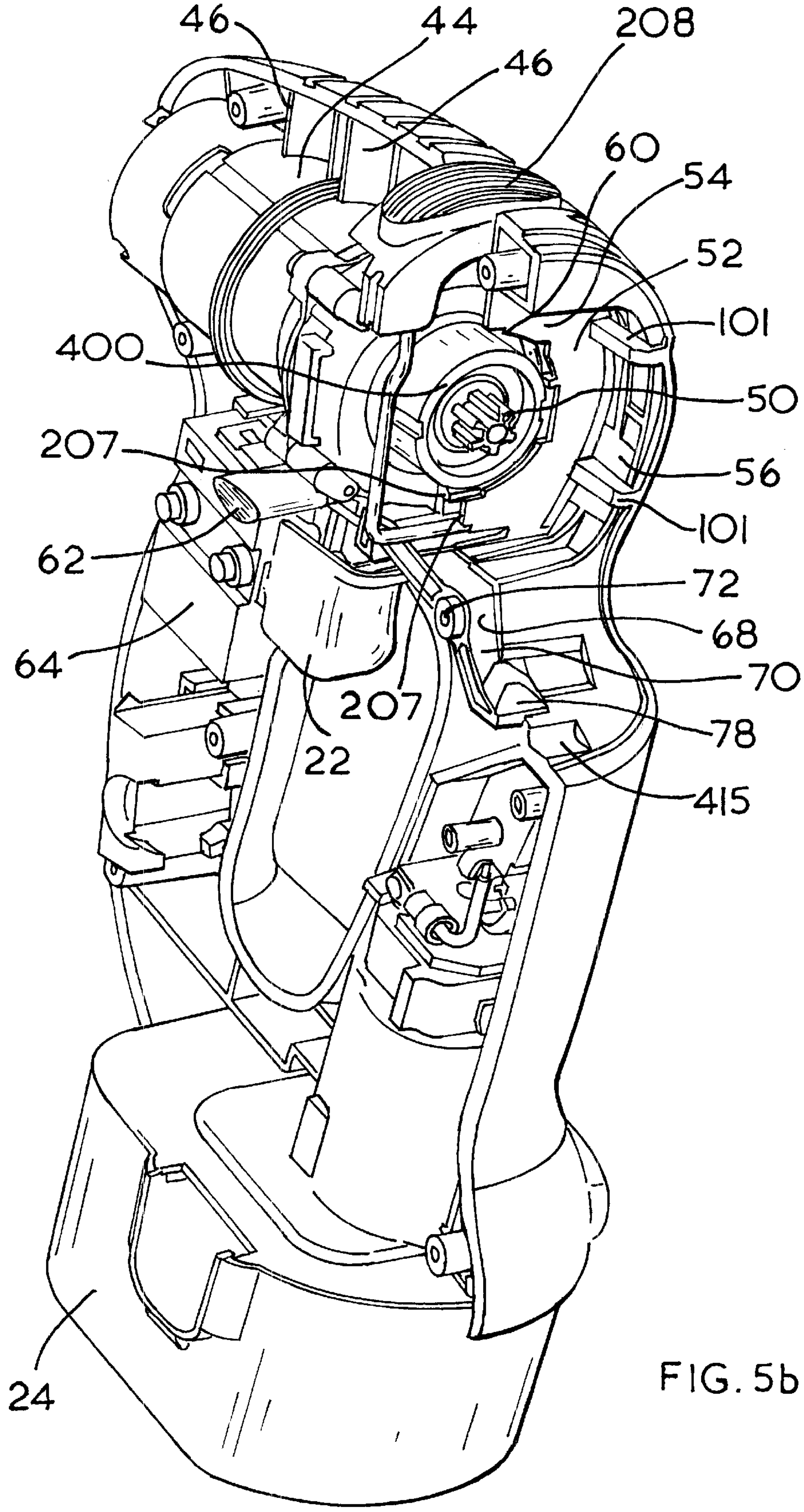
Figure 6:
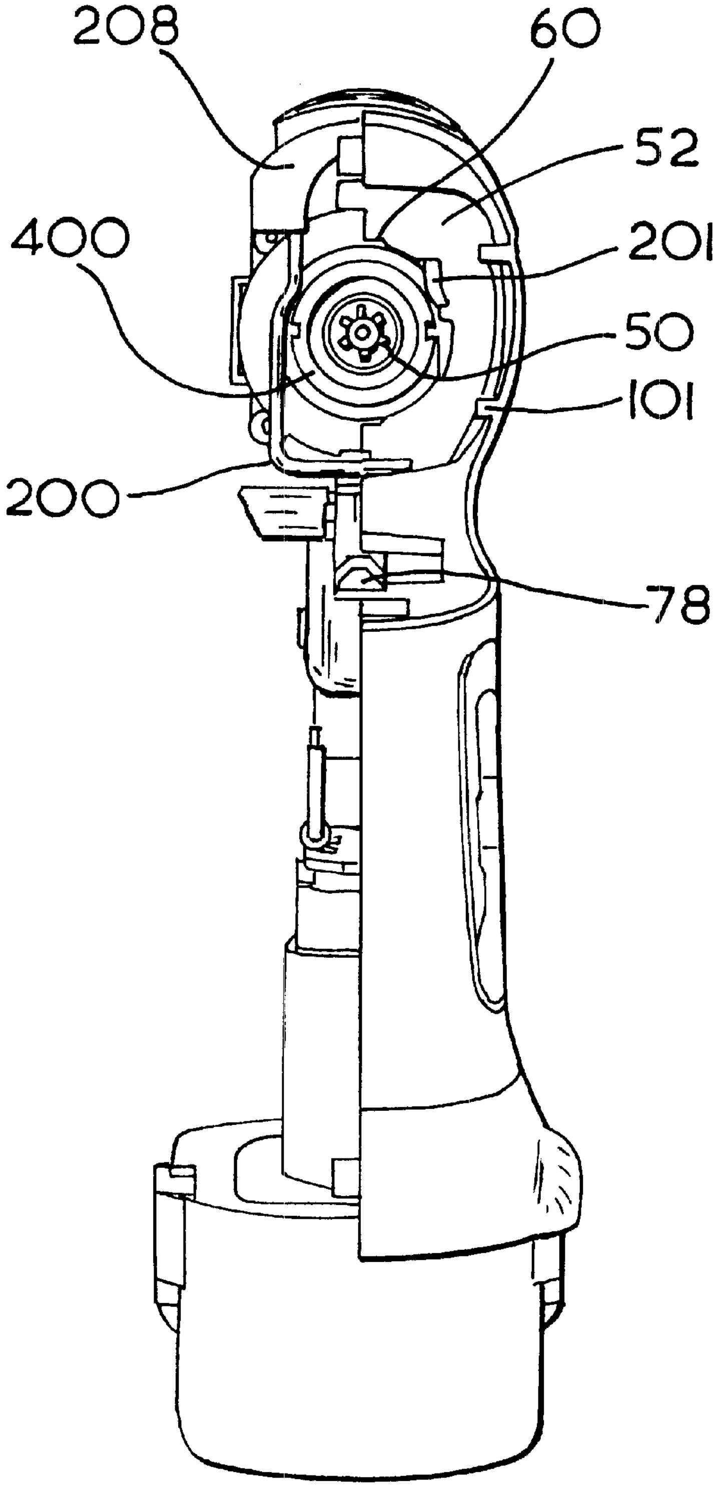
Figure 7A:
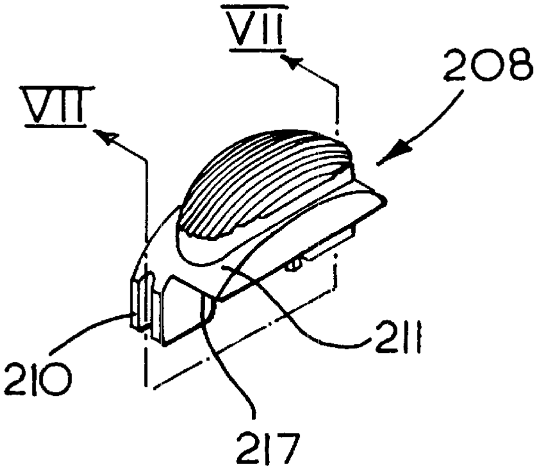
Figure 7B:
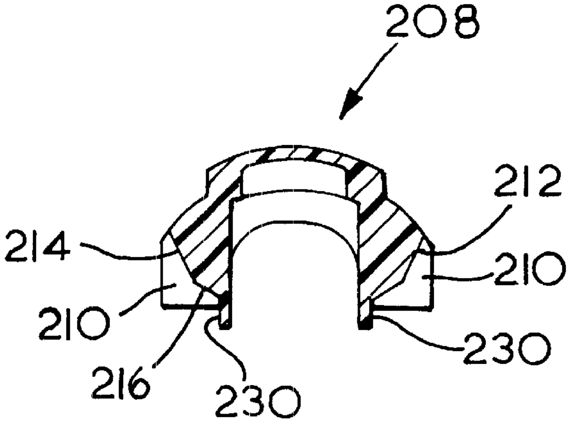
Figure 7C:
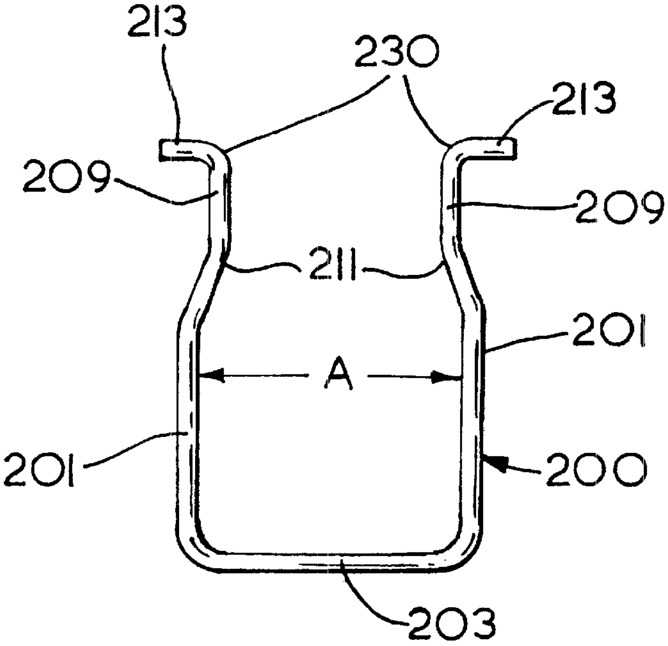
Figure 8:
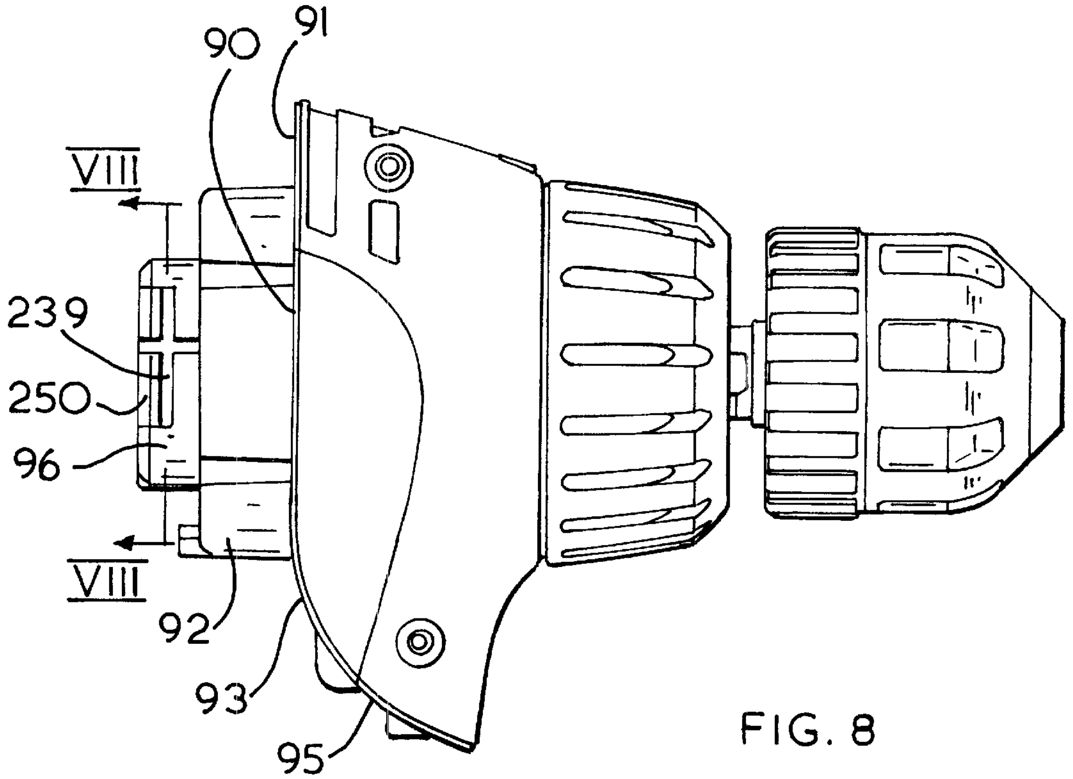
Figure 8A:
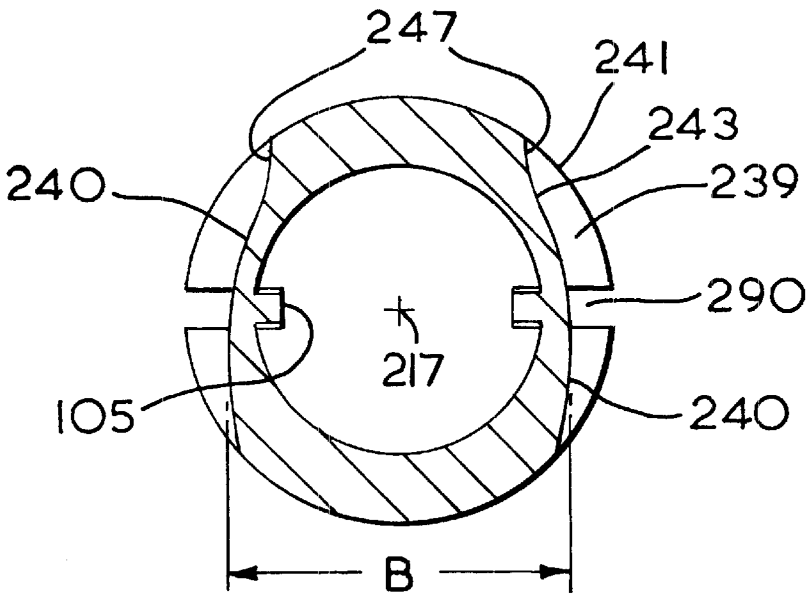
Figure 8B:
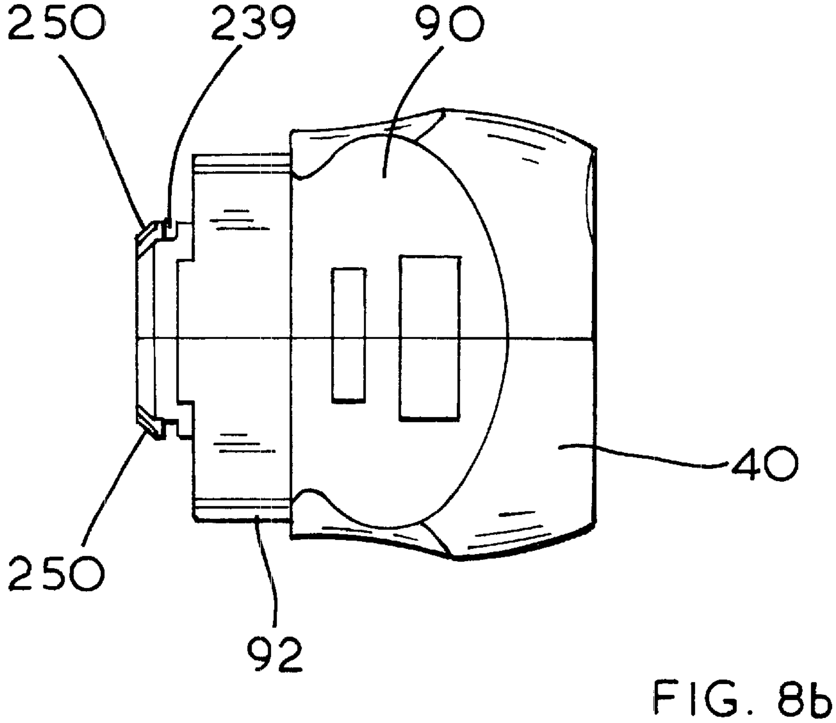
Figure 9:
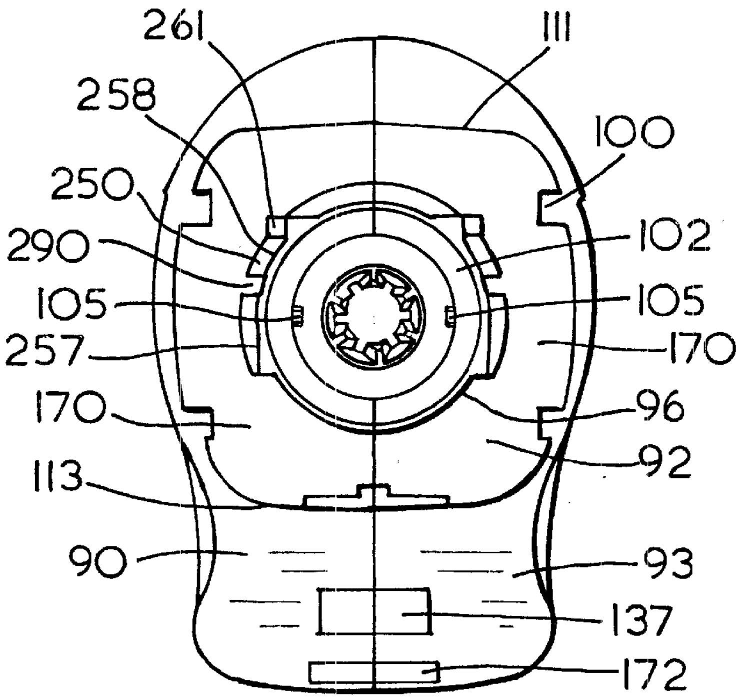
Figure 10A:
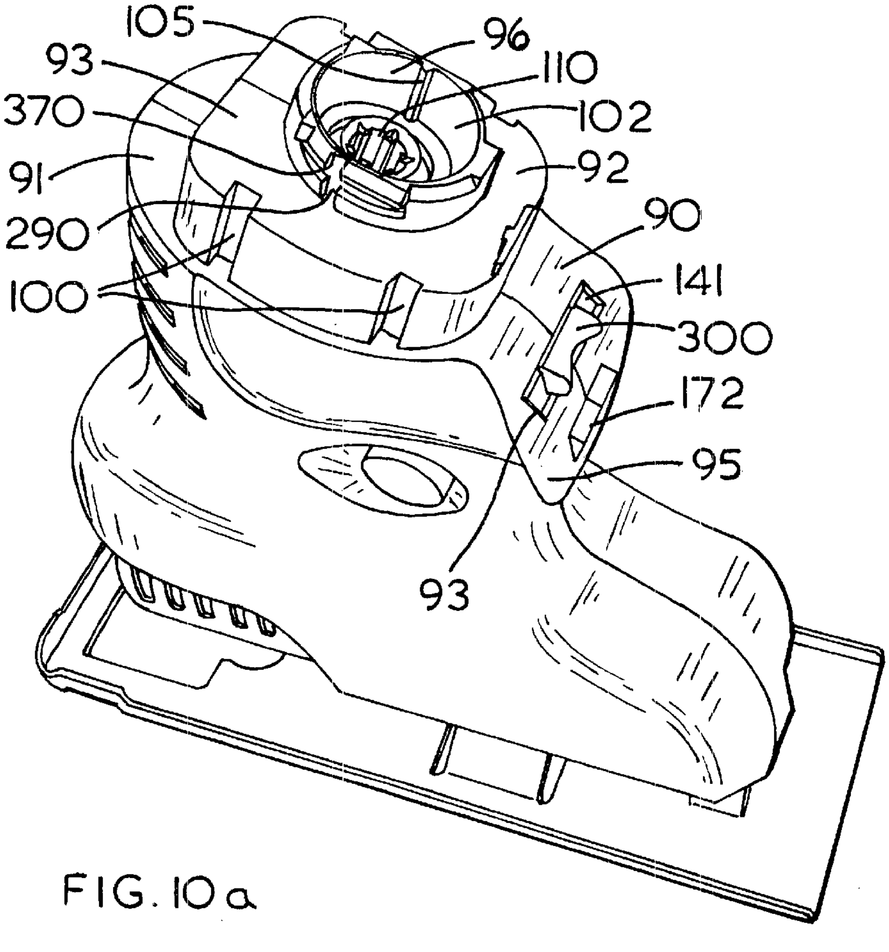
Figure 10B:
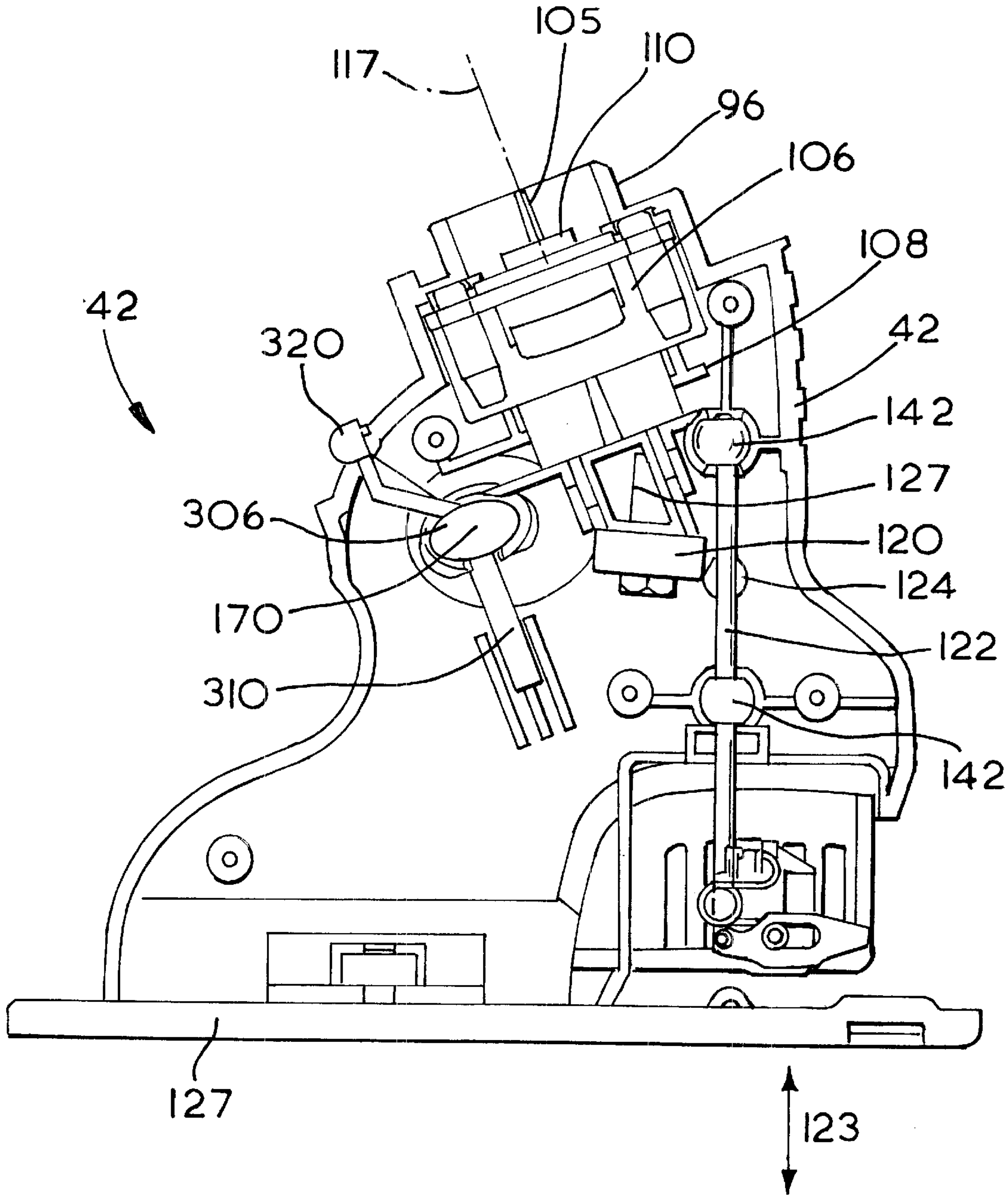
Figure 10C:
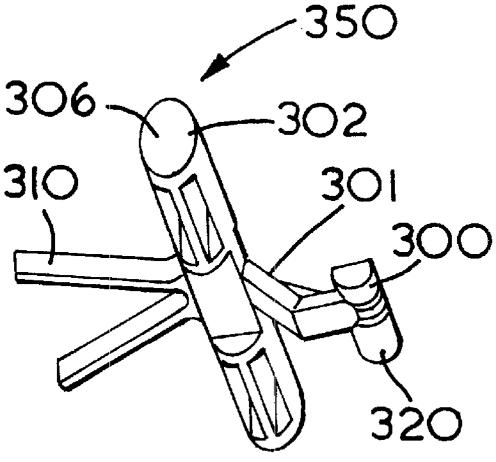
Figure 10D:
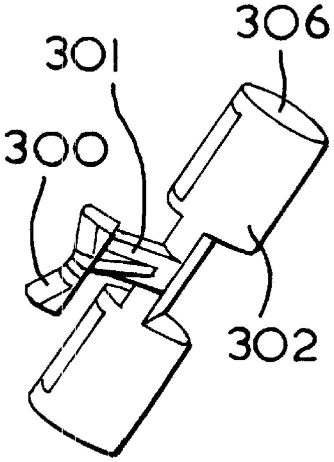
Figure 10E:
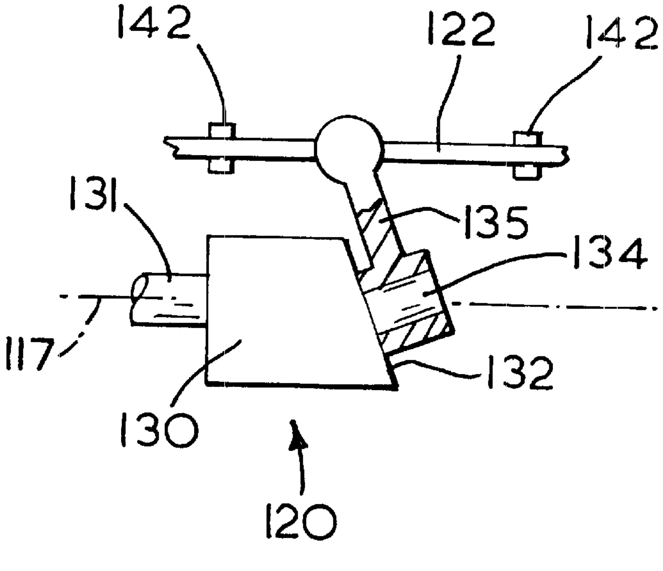

FIG. 2*a* shows a part side elevation of the power tool of FIG. 2 having one half of the clam shell of the tool body and tool head removed;

FIG. 3 shows a side elevation of the power tool of FIG. 1 with a jigsaw head attachment;

FIG. 4 shows a side elevation of the tool body of FIG. 1;

FIG. 5*a* shows a side elevation of the body portion of the power tool of FIG. 1 with one half clam shell removed;

FIG. 5*b* shows the front perspective view of the body portion of FIG. 1 with half the clam shell removed;

FIG. 6 is a front elevation of the power tool body of FIG. 1 with part of the clam shell removed;

FIG. 7*a* is a perspective view of the tool head release button;

FIG. 7*b* is a cross-section of the button of FIG. 7*a* along the lines 7—7;

FIG. 7*c* is a front view of a tool head clamping spring for the power tool of FIG. 1;

FIG. 8 is a side elevation of the drill head of FIG. 2;

FIG. 8*a* shows a cross-sectional view of a cylindrical spigot (96) of a tool head taken along the lines of VIII—VIII of FIG. 8;

FIG. 8*b* is a view from below of the interface (90) of the drill head tool attachment (40) of FIG. 8;

FIG. 9 is a rear view of the drill head of FIG. 8;

FIG. 10*a* is a rear perspective view of the jigsaw head of FIG. 3;

FIG. 10*b* is a side elevation of the jigsaw tool head of FIG. 3 with half clam shell removed;

FIG. 10*c* is a perspective view of an actuating member from below;

FIG. 10*d* is a perspective view of the actuating member of FIG. 10*c* from above;

FIG. 10*e* is a schematic view of a motion conversation mechanism of the tool head of FIG. 10*b*.

Figure 11:
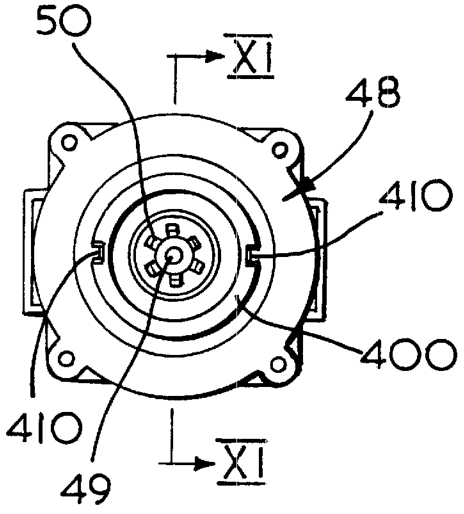
Figure 12:
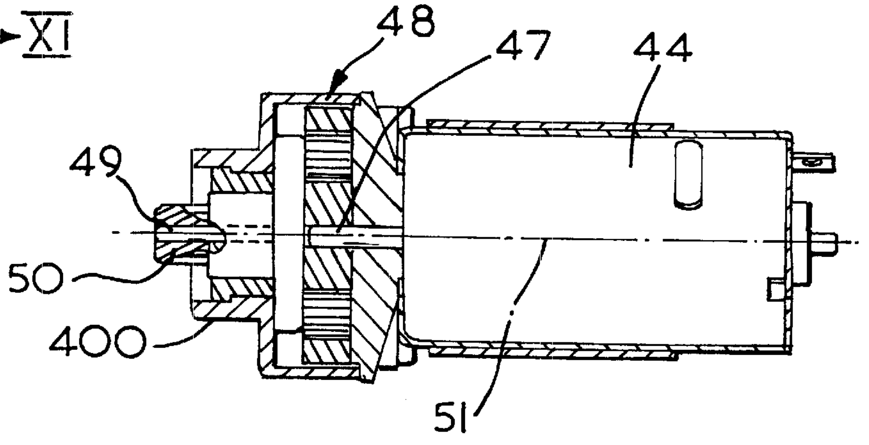
Figure 13:
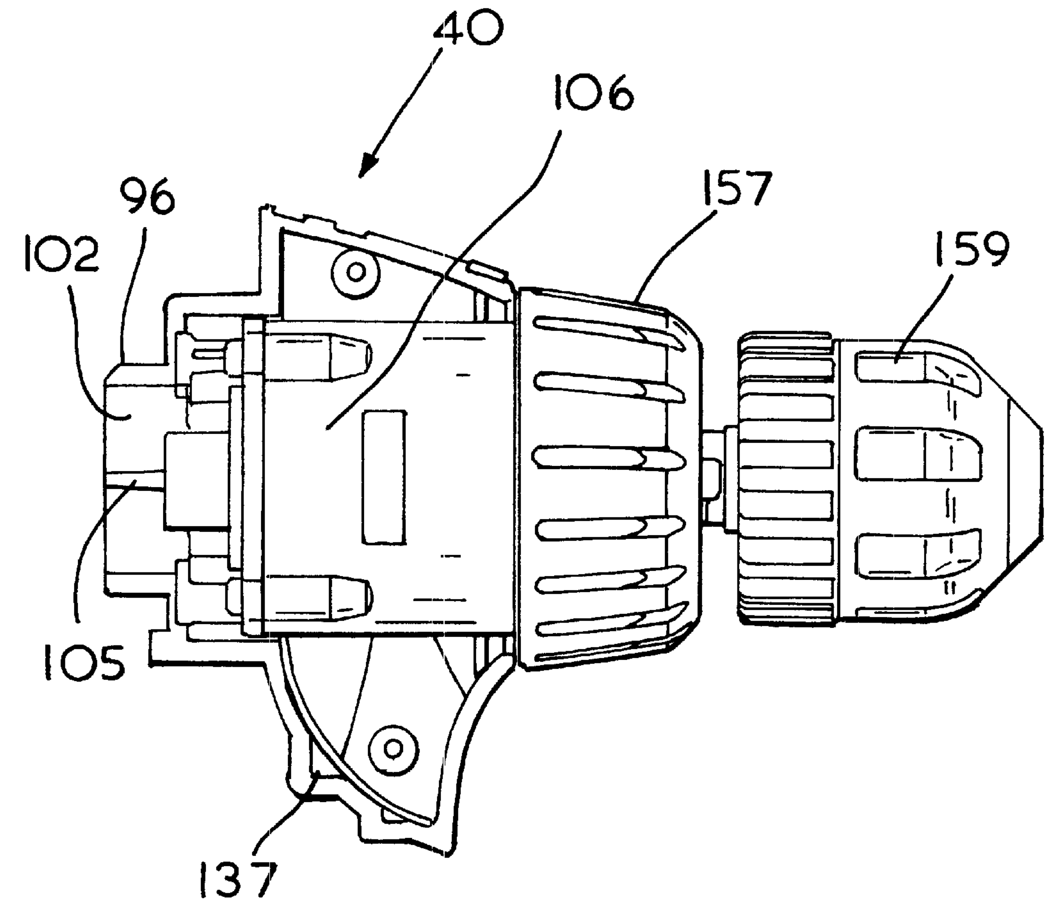

FIG. 11 is a front elevation of the combined gearbox and motor of the power tool of FIG. 1;

FIG. 12 is a schematic cross-sectional view of the motor and gearbox mechanism of FIG. 11 along the lines XI—XI;

FIG. 13 is a side elevation of the drill head as shown in FIG. 8 with part clam shell removed.

Referring now to FIG. 1, a power tool shown generally as (10) comprises a main body portion (12) conventionally formed from two halves of a plastics clam shell (14, 16). The two halves of the clam shell are fitted together to encapsulate the internal mechanism of the power tool, to be described later.

The body portion (10) defines a substantially D-shaped body, of which a rear portion (18) defines a conventional pistol grip, handle to be grasped by the user. Projecting inwardly of this rear portion (18) is an actuating trigger (22) which is operable by the user's index finger in a manner conventional to the design of power tools. Since such a pistol grip design is conventional, it will not be described further in reference to this embodiment.

The front portion (23) of the D-shaped body serves a dual purpose in providing a guard for the user's hand when gripping the pistol grip portion (18) but also serves to accommodate battery terminals (25) (FIG. 5*a*) and for receiving a battery (24) in a conventional manner.

Referring to FIGS. 5*a* and 5*b*, the front portion (23) of the body contains two conventional battery terminals (25) for co-operating engagement with corresponding terminals (not shown) on a conventional battery pack stem (32). The front portion (23). of the body is substantially hollow to receive the stem (32) of the battery (24) (as shown in FIG. 5*a*) whereby the main body portion (33) of the battery projects externally of the tool clam shell. In this manner, the main body portion (33) of the battery is substantially rectangular and is partially received within a skirt portion (34) of the power tool clam shell for the battery to sit against and co-operate with an internal shoulder (35) of the power tool in a conventional manner.

The battery has two catches (36) on opposed sides thereof which include (not shown) two conventional projections for snap fitting engagement with corresponding recesses on the inner walls of the skirt (34) of the power tool. These catches are resiliently biassed outwardly of the battery (32) so as to effect such snap engagement. However, these catches may be displaced. against their biassing to be moved out of engagement with recesses on the skirt to allow the battery to be removed as required by the end user. Such battery clips are again considered conventional in the field of power tools and such will not be described further herein.

The rear portion (18) of the clam shell has a slightly recessed grip area (38) which recess is moulded in the two clam shell halves. To assist comfort of the power tool user, a resilient rubberised material is then integrally moulded into such recesses to provide a cushioned grip member. This helps provide a degree of damping of the power tool vibration (in use) against the user's hand.

Referring to FIGS. 2 and 3, interchangeable tool heads (40, 42) may be releasably engaged with the power tool body portion (12). FIG. 2 shows the power tool (10) whereby a drill head member (40) has been connected to the main body portion (12) and FIG. 3 shows a jigsaw head member (42) attached to the body portion (12) to produce a jigsaw power tool. The mechanisms governing the attachment orientation and arrangement of the tool heads on the tool body will be described later.

Referring again to FIGS. 5*a* and 5*b*, which shows the power tool (10) having one of the clam shells (16) removed to show, schematically, the internal workings of the power tool. The tool (12) comprises a conventional electrical motor (44) retainably mounted by internal ribs (46) of the clam shell (14). (The removed clam shell (16) has corresponding ribs to also encompass and retain motor). The output spindle (47) of the motor (FIG. 12) engages directly with a conventional epicyclic gearbox (also known as a sun and planet gear reduction mechanism) illustrated generally as (48) (reference also made to FIG. 11). To those skilled in the art, the use of an epicyclic gear reduction mechanism is standard practice and will not be described in detail here save to explain that the motor output generally employed by such power tools will have a rotary output of approximately 15,000 rpm whereby the gear and planetary reduction mechanism will reduce the rotational speed of the drive mechanism dependent on the exact geometry and size of the respective gear wheels within the gear mechanism. However, conventional gear reduction mechanisms of this type will generally employ a gear reduction of between 2 to 1 and 5 to 1 (e.g. reducing a 15,000 rpm motor output to a secondary output of approximately 3,000 rpm). The output (49) of the gear reduction mechanism (48) comprises an output spindle, coaxial with the rotary output axis of the motor, and has a male cog (50) again mounted coaxially on the spindle (49).

The male cog (50) shown clearly in FIG. 5*b* comprises six projecting teeth disposed symmetrically about the axis of the spindle (49) wherein each of the teeth, towards the remote end of the cog (50), has chamfered cam lead-in surfaces tapering inwardly towards the axis to mate with co-operating cam surfaces on a female cog member having six channels for receiving the teeth in co-operating engagement.

Referring to FIGS. 1, 5*a*, 5*b* and 6, the power tool body portion (12) has a front facing recess (52) having an inner surface (54) recessed inwardly of the peripheral edge of a skirt (56) formed by the two halves of the clam shell. Thus the skirt (56) and the recessed surface (54) form a substantially rectangular recess on the tool body substantially co-axial with the motor axis (51). The surface (54) further comprises a substantially circular aperture (60) through which the male cog (50) of the gear mechanism projects outwardly into the recess (52). As will be described later, each of the tool heads when engaged with the body will have a co-operating female cog for meshed engagement with the male cog.

As is conventional for modem power tools, the motor (44) is provided with a forward/reverse switch (62) which, on operation, facilitates reversal of the terminal connections between the battery (24) and the motor (44) via a conventional switching arrangement (64), thereby reversing the direction of rotation of the motor output as desired by the user. As is conventional, the reverse switch (62) comprises a plastics member projecting transversely (with regard to the axis of the motor) through the body of the tool so as to project from opposed apertures in each of the clam shells (14, 16) whereby this switch (62) has an internal projection (not shown) for engaging with a pivotal lever (66) on the switch mechanism (64) so that displacement of the switch (62) in a first direction will cause pivotal displacement of the pivotal lever (66) in the first direction to connect the battery terminals to the motor in a first electrical connection and whereby displacement of the switch (62) in an opposed direction will effect an opposed displacement of the pivotal lever to reverse the connections between the battery and the motor. This is conventional to power tools and will not be described further herein. It will be appreciated that, for clarity, the electrical wire connections between the battery, switch and motor have been omitted to aid clarity in the drawings.

Furthermore, the power tool (10) is provided with an intelligent lock-off mechanism (68) which is intended to prevent actuation of the actuating trigger (22) when there is no tool head attachment connected to the body portion (10). Such a lock-off mechanism serves a dual purpose of preventing the power tool from being switched on accidentally and thus draining the power source (battery) when not in use whilst it also serves as a safety feature to prevent the power tool being switched on when there is no tool head attached which would present exposed high speed rotation of the cog (50).

The lock-off mechanism (68) comprises a pivoted lever switch member (70) pivotally mounted about a pin (72) integrally moulded with the clam shell (16). The switch member (70) is substantially an elongate plastics pin having at its innermost end a downwardly directed projection (74) (FIG. 5*a*) which is biased by conventional spring member (not shown) in a downward direction to the position shown in FIG. 5*a* so as to abut and engage a projection (76) integral with the actuating trigger (22). The projection (76) on the trigger (22) presents. a rearwardly directed shoulder which engages the pivot pin projection (74) when the lock-off mechanism (68) is in the unactuated position as shown in FIG. 5*a*.

In order to operate the actuating trigger (22) it is necessary for the user to depress the trigger (22) with their index finger so as to displace the trigger switch member 70 from right to left as viewed in FIG. 5*a*. However, the abutment of the trigger projection (76) against the projection (74) of the lock-off mechanism restrains the trigger switch member 70 from displacement in this manner.

The opposite end of the switch member (70) has an outwardly directed cam surface (78) being inclined to form a substantially inverted V-shaped profile as seen in FIGS. 1 and 6.

The cam surface (78) is recessed inwardly of an aperture (80) formed in the two halves of the clam shell. As such, the lock-off mechanism (68) is recessed within the body of the tool but is accessible through this aperture (80).

As will be described later, each of the tool heads (40, 42) to be connected to the tool body comprise a projection member which, when the tool heads are engaged with the tool body, will project through the aperture (80) so as to engage the cam surface (78) of the lock-off mechanism to pivotally deflect the switch member (70) about the pin (72) against the resilient biassing of the spring member, and thus move the projection (74) in an upwards direction relative to the unactuated position shown in FIG. 5, thus moving the projection (74) out of engagement with the trigger projection (76) which thus allows the actuating trigger (22) to be displaced as required by the user to switch the power tool on as required. Thus, attachment of a tool head can automatically deactivate the lock-off mechanism.

In addition, an additional feature of the lock-off mechanism results from the requirement, for safety purposes, that certain tool head attachments to form particular tools—notably that of a reciprocating saw—necessitate a manual, and not automatic, deactivation of the lock-off mechanism. Whereas it is acceptable for a power tool such as a drill or a sander to have an actuating trigger switch (22) which may be depressed when the tool head is attached, without any safety lock-off switch, the same is generally unacceptable for tools such as reciprocating saws, whereby accidental activation of a reciprocating saw power tool could result in serious injury if the user is not prepared. For this reason, reciprocating saw power tools have a manually operable switch to deactivate any lock-off mechanism on the actuating trigger (22). A specific manually activated mechanism for deactivating the lock-off mechanism will be described subsequently with reference to the tool head for the reciprocating saw (42).

Each of the tool heads (40, 42) are designed for co-operating engagement with the tool body (12). As such, each of the tool heads (40, 42) have a common interface (90) for co-operating engagement with the body (12). The interface (90) on the tool heads comprises a rearwardly extending surface member (93) which comprises a substantially first linear section (91) (when viewed in profile for example in FIG. 8) and a second non-linear section (95) forming a substantially curved profile. The profile of this surface member (93) corresponds to a similar profile presented by the external surface of the clam shells of the power tool (12) about the cog member (51) and associated recess (52) as best seen in FIG. 4. The interface (90) further comprises a concentric array of two spigots (92, 96) which are so positioned on the substantially flat interface surface (91) so as to be received in a complementary fit within the recess (52) and the associated circular aperture (60) formed in the tool body. The configuration of the interface (90) is consistent with all tool heads irrespective of the actual function and overall design of such tool heads.

Referring now to FIGS. 1 and 6, it will be appreciated that the front portion of the tool body (12) for receiving the tool head comprises both the recess (52) for receiving the spigot (92) of the tool head and secondly comprises a lower curved surface presenting a curved seat for receiving a correspondingly curve surface (i.e., non-linear section 95) of the tool head interface (90). This feature will be described in more detail subsequently.

The spigot arrangement of the interface (90) has a primary spigot (92) formed substantially as a square member (FIGS. 9 and 10*a*) having rounded corners. This spigot (92) corresponds in depth to the depth of the recess (52) of the tool body and is to be received in a complimentary fit therein. Furthermore, the spigot (92) has, on either side thereof, two longitudinally extending grooves (100) as best seen in FIGS. 8 and 10*a*. These grooves taper inwardly from the rearmost surface (93) of the spigot towards the tool head body. Corresponding projections (101) are formed on the inner surface of the skirt (56) of the tool recess (52) for co-operating engagement with the grooves (100) on the tool head. The projections (101) are also tapered for a complimentary fit within the grooves (100). These projections (101) and grooves (100) serve to both align the tool head with the tool body and restrain the tool head from rotational displacement relative to the tool body. This aspect of restraining the tool head from a rotational displacement is further enhanced by the generally square shape of the spigot (92) serving the same function. However, by providing for tapered projections (101) and recesses (100) provides an aid to alignment of the tool head to the tool body whereby the remote narrowed tapered edge of the projections (101) on the tool body firstly engage the wider profile of the tapered recesses (100) on the tool head thus alleviating the requirement of perfect alignment between the tool head and tool body when first connecting the tool head to the tool body. Subsequent displacement of the tool head towards the tool body causes the tapered projections (101) to be received within the tapered grooves (100) to provide for a close fitting wedge engagement between the projections and the associated recesses (100). It will be further appreciated from FIG. 9 that whilst we have described the spigot (92) as being substantially square, the spigot (92) has an upper edge (111) having a dimension greater than the dimension of the lower edge (113). This is a simple design to prevent accidentally placing the head attachment "upside down" when bringing it into engagement with the tool body, since if the tool head spigot (92) is not correctly aligned with the recess (52) it will not fit.

As seen in FIG. 8 and FIG. 10*a*, the common interface (90) has a second spigot member (96) in the form of a substantially cylindrical projection extending rearwardly of the first spigot member (92). The second spigot member (96) may be considered as coaxial with the first spigot member (92). The second spigot member (96) is substantially cylindrical having a circular aperture (102) extending through the spigot (92) into the interior of the tool head. Mounted within both the drill tool head (40) and jigsaw tool head (42), adjacent their respective apertures (102), is a further standard sun and planet gear reduction mechanism (106) (FIGS. 10*b* and 13). It should be appreciated that the arrangement of the interface member (90) is substantially identical between the two heads (40, 42) and the placement of the gear reduction mechanism (106) within each tool head with respect to the interface (90) is also identical for both tool heads and thus, by description of the gear mechanism and interface members (90) of the tool head in respect of the jigsaw head (42), a similar arrangement is employed within the drill tool head (40) (FIG. 13).

As seen in FIG. 10*b*, the tool heads are again conventionally formed from two halves of a plastic clam shell. The two halves are fitted together to encapsulate the internal mechanism of the power tool head to be described as follows. Internally moulded ribs on each of the two halves of the clam shell forming each tool head are used to support the internal mechanism and, in particular, the jigsaw tool head (42) has ribs (108) for engaging and mounting the gear reduction mechanism (106) as shown. The gear reduction mechanism (106), as mentioned above, is a conventional epicyclic (sun and planetary arrangement) gearbox identical to that as described in relation to the epicyclic gear arrangement utilised in the tool body. The input spindle (not shown) of the gear reduction mechanism (106) has coaxially mounted thereon a female cog (110) for co-operating meshed engagement with the male cog (50) of the power tool body. The spindle of the gear mechanism (106) and the female cog (110) extend substantially coaxial with the aperture (102) of the spigot (96) about the tool head axis (117). This is best seen in FIG. 10*a*. Furthermore, the rotational output spindle (127) of this gear mechanism (106) also extends coaxial with the input spindle of the gear mechanism.

Again referring to FIG. 10*b*, it will be seen that the rotational output, spindle (127) has mounted thereon a conventional motion conversion mechanism (120) for converting the rotary output motion of the gear mechanism (106) to a linear reciprocating motion of a plate member (122). A free end of the plate member (122) extends outwardly of an aperture in the clam shell and has mounted at this free end a jigsaw blade clamping mechanism. This jigsaw blade clamping mechanism does not form part of the present invention and may be considered to be any one of a standard method of engaging and retaining jigsaw blades on a plate member.

The linear reciprocating motion of the plate member (122) drives a saw blade (not shown) in a linear reciprocating motion indicated generally by the arrow (123). Whilst it can be seen from FIG. 10*b* that this reciprocating motion is not parallel with the axis (117) of the tool head, this is merely a preference for the ergonomic design of the particular tool head. If necessary, the reciprocating motion could be made parallel with the tool head axis. The tool head (42) itself is a conventional design for a reciprocating or pad saw having a base plate (127) which is brought into contact with the surface to be cut in order to stabilise the tool (if required).

The drive conversion mechanism (120) utilises a conventional reciprocating space crank illustrated, for clarity, schematically in FIG. 10*c*. The drive conversion mechanism (120) will have a rotary input (131) (which for this particular tool head will be the gear reduction mechanism). The rotary input (121) is connected to a link plate (130) having an inclined front face (132) (inclined relative to the axis of rotation of the input). Mounted to project proud of this surface (132) is a tubular pin (134) which is caused to wobble in reference to the axis (117) of rotation of the input (130). Freely mounted on this pin (134) is a link member (135) which is free to rotate about the pin (134). However this link member (135) is restrained from rotation about the drive axis (117) by engagement with a slot within a plate member (122). This plate member (122) is free (in the embodiment of FIGS. 10*b* and 10*c*) to move only in a direction parallel with the axis of rotation of the input. The plate member (127) is restrained by two pins (142) held in place by the clam shell and is enabled to pass therethrough. Thus, the wobble of the pin (134) is translated to linear reciprocating motion of the plate (122) via the link member (135). This particular mechanism for converting rotary to linear motion is conventional and has only been shown schematically for clarification of the mechanism (120) employed in this particular saw head attachment. In the saw head (42) the plate (122) is provided for reciprocating linear motion between the two restraining members (142) and has attached at a free end thereof a blade clamping mechanism (150) for engaging a conventional saw blade in a standard manner. Thus the tool head employs both a gear reduction mechanism (106) and a drive conversion mechanism (120) for converting the rotary output of the motor to a linear reciprocating motion of the blade.

An alternative form of tool head is shown in FIG. 13 with respect to a drill head (40). Again this drill head (40) (also shown in FIG. 8*a*) comprises the interface (90) corresponding to that previously described in relation to tool head (42). The tool head (40) again comprises a epicyclic gearbox (106) similar in construction to that previously described for both the power tool and the jigsaw head. The input spindle of this gear reduction mechanism (106) again has co-axially mounted thereon a female cog similar to that described with reference to the saw head for meshed engagement with the male cog (50) on the output spindle of the power tool. The output of the epicyclic gearbox (106) in the tool head (40) is then co-axially connected to a drive shaft of a conventional drill clutch mechanism (157) which in turn is co-axially mounted to a conventional drill chuck (159).

It will be appreciated that for the current invention of a power tool having a plurality of interchangeable tool heads, that the output speed of various power tools varies from function to function. For example, a sander head (although not described herein) would require an orbital rotation output of approximately 20,000 rpm. A drill may require a rotational output of approximately 2–3,000 rpm, whilst a jigsaw may have a reciprocal movement of approximately 1–2,000 strokes per minute. The conventional output speed of a motor as used in power tools may be in the region of 20–30,000 rpm thus, in order to cater for such a vast range of output speeds for each tool head, derived from a single high speed motor, would require various sized gear reduction mechanisms in each head. In particular for the saw head attachment, significant reduction of the output speed would be required and this would probably require a large multi-stage gearbox in the jigsaw head. This would be detrimental to the performance of a drill of this type since such a large gear reduction mechanism (probably multi-stage gearbox) would require a relatively large tool head resulting in the jigsaw blade being held remote from the power saw (motor) which could result in detrimental out of balance forces on such a jigsaw. To alleviate this problem, the current invention employs the use of sequentially or serially coupled gear mechanisms between the tool body and the tool heads. In this manner, a first stage gear reduction of the motor output speed is achieved for all power tool functions within the tool body whereby each specific tool head will have a secondary gear reduction mechanism to adjust the output speed of the power tool to the speed required for the particular tool head function. As previously mentioned, the exact ratio of gear reduction is dependent upon the size and parameters of the internal mechanisms of the standard epicyclic gearbox but it will be appreciated that the provision for a first stage gear reduction in the tool head to then be sequentially coupled with a second stage gear reduction in the tool body allows for a more compact design of the tool heads whilst allowing for a simplified gear reduction mechanism within the tool head since such a high degree of gear reduction is not required from the first stage gear reduction.

In addition, the output of the second stage gear reduction in the tool head may then be retained as a rotational output transmitted to the functional output of the tool head (i.e. a drill or rotational sanding plate) or may itself undergo a further drive conversion mechanism to convert the rotary output into a non-rotary output as described for the tool head in converting the rotary output to a reciprocating motion for driving the saw blade.

The saw tool head (42) is also provided with an additional manually operable button (170) which, on operation by the user, provides a manual means of deactivating the lock-off mechanism of the power tool body when the tool head (42) is connected to the tool body. As previously described, the tool body has a lock-off mechanism (68) which is pivotally deactivated by insertion of an appropriate projection on the tool head into the aperture (80) to engage the cam surface (78) to deactivate the pivoted lock-off mechanism. Usually the projection on the tool head is integrally moulded with the head clam shell so that as the tool head is introduced into engagement with the tool body such deactivation of the lock-off mechanism is automatic. In particular, with reference to FIGS. 9 and 13 showing the drill tool head (40), it will be seen that the interface (90) has on the curved surface (93) a substantially rectangular projection (137) of complimentary shape and size to the aperture (80). This projection (137) is substantially solid and integrally moulded with the clam shell of the tool head. In use as it enters through the aperture (80) this solid projection (137) simply abuts the cam surface (78) to effect pivotal displacement of the lock-off mechanism (68). However, for the purposes of products such as reciprocating saw heads (42) it is further desirable that activation of the power tool, even with the tool head attached, is restricted until a further manual operation is performed by the user when they are ready to actually utilise the tool. Thus, the saw head (42) is provided with the button (170) to meet this requirement. This manual lock-off deactivation system comprises a substantially rectangular aperture (141) formed between two halves of the tool head clam shell as shown in FIG. 10*a* through which projects a cam member (300) which is substantially V-shaped (FIGS. 10*a* and 10*c*). This cam member (300) has a general V-shaped configuration and orientation so that when the saw head (42) is attached to the tool body (12), the cam surface (78) of the lock-off mechanism is received within the inclined V-formation of this cam member (300) without any force being exerted on the cam member (78) to deactivate the lock-off mechanism.

Referring now to FIGS. 10*c* and 10*d*, it can be seen that the cam member (300) is connected by a leg (301) to the mid region of a plastics moulded longitudinally extending bar (302) to form an actuation member (350). This bar (302), when mounted in the tool head (42) extends substantially perpendicular to the axis of the tool head (and to the axis (117) of the tool body) so that each of the free ends (306) of the bar (302) projects sideways from the opposed side faces of the tool head (FIG. 10*a*) to present two external buttons (only one of which is shown in FIG. 10*a*). Furthermore, the bar member (302) comprises two integrally formed resiliently deflectable spring members (310) which, when the bar member (302) is inserted into the tool head clam shells, each engage adjacent side walls of the inner surface of the clam shell, serving to hold the bar member substantially centrally within the clam shell to maintain the cam surface (300) at a substantially central orientation as it projects externally at the rear of the tool head through the aperture (141). A force exerted to either face (306) of the bar member (302) projected externally of the tool head will displace the bar member inwardly of the tool head against the resilience of one of the spring members (310), whereby such displacement of the bar member effects comparable displacement of the cam member (300) laterally across the aperture (141). It will therefore be appreciated that, dependent on which of the two surfaces (306) are depressed, the cam member (300) may be displaced in either direction transversely of the tool head axis. In addition, when the external force is removed from the surface (306), the biassing force of the spring member (310) (which is resiliently deformed) will cause the bar member (302) to return to its original central position. For convenience, this cam and bar member (300 and 302) comprise a one-piece moulded plastics unit with two spring members (310) moulded therewith.

When the tool head (42) is attached to the tool body (12) (as will be described in greater detail later) the cam surface (78) of the lock-off mechanism is received in co-operating engagement within the V-shaped configuration of the cam surface (300). The cam surface (78) (as seen in FIGS. 1 and 6) has a substantially convex configuration extending along its longitudinal axis and having two symmetrical cam faces disposed either side of a vertical plane extending along the central axis of the member (70). Whereas the cam surface (300) has a corresponding concave cam configuration having two symmetrical cam faces inversely orientated to those cam faces of cam (78) to provide for a butting engagement between the two cam surfaces. When the tool head (42) is attached to the tool body, the concave cam surfaces (300) co-operatingly receives the convex cam surfaces (78) in a close fit so that no undue force is exerted from the cam surface (300) to the cam surface (78) so as to deactivate the lock-off mechanism which remains engaged with the switch (22) preventing operation of the power tool. This prevents the power saw configuration from being accidentally switched on. When the tool is desired to be operated, the user will place one hand on the pistol grip (18) so as to have the index finger engaged to the switch (22). A second hand will then grip the tool head attachment (42) in a conventional manner for operating a reciprocating saw, the second hand serving to stabilise the saw in use. The users second hand will then serve to be holding the power tool adjacent one of the projecting surfaces (306) or the actuating member (350) which is readily accessible by finger or thumb of that hand. When the operator wishes to then start using the tool he may depress one of the surfaces (306) with his thumb or forefinger to cause lateral displacement of the cam surface (300) with regard to the tool head axis, causing an inclined surface (320) of the convex surface (300) to move sideways into engagement with one of the convex inclined surfaces of the cam surface (78), effectively displacing the cam surface (78) downwardly with respect to the tool body, thereby operating the lock-off mechanism (68) in a manner similar to that previously discussed with regard to the automatic lock-off deactivation mechanism.

When the surface (306) is released by the operator the cam surface (300) returns to its central position under the resilient biassing of the spring members (310) and out of engagement with the cam surface (78). However, due to the trigger switch remaining in the actuated position, the lock-off member (68) is unable to re-engage with the switch until that switch (22) is released. Thus when one of the actuating member buttons (306) on the tool head is depressed, the power tool may be freely used until the switch (22) is subsequently released, at which time if the user wishes to recommence operation he will again have to manually deactivate the lock-off mechanism by depressing one of the buttons (306).

Referring now to FIGS. 11 and 12 (showing a cross-section of the gear reduction mechanism of the tool body), it will be appreciated that the output spindle of the gear reduction mechanism and the male cog member (50) mounted thereon are substantially surrounded by a circular collar (400) coaxial with the axis of the output spindle. As best seen in FIG. 5*b* it will be appreciated that the male cog (50) and this concentric collar (400) project through the circular aperture (60) in the tool surface (54) into the recess (52) of the power tool. The external diameter of the collar (400) on the gear reduction mechanism (48) corresponds to the internal diameter of the aperture (102) of the spigot (96) on each of the tool heads. The collar (400) also has two axially extending diametrically opposed rebates (410) which taper inwardly towards the gear reduction mechanism (48). Furthermore, integrally formed on the internal surface of the aperture (102) of the spigot member (96) are two corresponding projections (105), diametrically opposed about the tool head axis (117) and here taper outwardly in a longitudinal direction towards the gear reduction mechanism of the tool head.

When the tool head is brought into engagement with the tool body the collar (400) of the reduction mechanism in the tool body is received in a complementary fit within the aperture (102) of the tool head with the projections (105) on the internal surface of the aperture (102) being received in a further complementary fit within the rebates (410) formed in the outer surface of the collar member (400). Again, due to the complimentary tapered effect between the projections (105) and the rebates (410) a certain degree of tolerance is provided when the tool head is first introduced to the tool body to allow alignment between the various projections and rebates with continued insertion gradually bringing the tapered surfaces of the projections and rebates into complimentary wedged engagement to ensure a snug fit between the tool head and the tool body and the various locking members.

This particular arrangement of utilising first (92) and second (96) spigots on the tool head for complementary engagement with recesses within the tool body provides for engagement between the tool head and the clam shell of the tool body and further provides for engagement between the clam shell of the tool head and of the gear reduction mechanism, and hence rotary output, of the tool body. In this manner, rigid engagement and alignment of the output spindle of the gear mechanism of the tool body and the input spindle of the gear reduction mechanism of the tool head is achieved whilst also obtaining a rigid engagement between the clam shells of the tool head and tool body to form a unitary power tool by virtue of the integral engagement of the respective gear mechanisms.

Where automatic deactivation of the lock-off mechanism (68) is required, such as when attaching a drill head to the tool body, a substantially solid projection (137) is formed integral with the clam shell surface (FIGS. 9 and 13) which presents a substantially rectangular profile which, as the tool head (40) is engaged with the tool body (12) the projection (137) co-operates with the rectangular aperture communicating with the pivotal lever (66) so as to engage the cam surface (78) and effect pivotal displacement of the pivoted lever (66) about the pin member (72) so as to move the downwardly directed projection (74) out of engagement with the projection (76) on the actuating trigger (20). Thus, once the drill head (40) has been fully connected to the body (12) the lock-off mechanism is automatically deactivated allowing the user freedom to use the power tool via squeezing the actuating trigger (22).

It will also be appreciated from FIGS. 8 through 10 that the interface (90) of each of the tool heads (40, 42) comprise two additional key-in members formed integrally on the clam shell of the tool head. The spigot (92) has on its outermost face (170) a substantially inverted "T" shaped projection extending parallel with the axis (117) of the tool head axis. This projection is received within a co-operating aperture on the inner surface (54) of the recess (52) of the tool body. A further, substantially rectangular, projection (172) is disposed on the interface (90) below the automatic lock-off projection (137) when viewed in FIGS. 8 and 9 again for co-operating engagement with a correspondingly shaped recess (415) formed in the surface of the clam shell of the tool body. These key-in projections again serve to help locate and restrain the tool head in its desired orientation on the tool body.

To restrain the tool head (40, 42) from axial displacement from the tool body once the tool head and tool body have been brought into engagement (and the various projections and rebates between the tool head and tool body have been moved into co-operating engagement), a releasable detent means, which in the specific embodiment is a spring member, is mounted on the tool body so as to engage with the interface (90) of the tool head to restrain the tool head from relative displacement axially out of the tool body. The engagement between the detent means (spring) and the interface (90) of the tool head provides for an efficient interlock mechanism between the tool head and the tool body.

The spring member (200) comprises two resiliently deflectable arms (201) which, in this preferred embodiment, are comprised in a single piece spring as shown in FIG. 7*c*. The spring member 200 is restrained in its desired orientation within the clam shell of the tool body by moulded internal ribs (207) on the tool clam shell (FIG. 5*b*). Spring member 200 is substantially U-shaped wherein the upper ends (209) of both arms of this U-shaped. spring taper inwardly by means of a step (211) to form a symmetrical U-shaped configuration having a narrow neck portion. The free ends (213) of the two arms are then folded outwardly at 90° to the arm members as best shown in FIG. 7*c*.

A release button (208) serves as an actuator means for the spring member 200 (as best seen in FIG. 7*a*). This button (208) comprises two symmetrically opposed rebates (210) each having inner surfaces for engaging the spring member (202) in the form of inner cammed faces (212) as best seen in FIG. 7*b* which represents a cross-section of the button members (208) along the lines VII—VII (through the rebates (210)) in FIG. 7*a*. It will be appreciated that these inner cammed faces (212) comprise two cammed surfaces (214 and 216), forming a dual gradient surface, which are inclined at different angles to the vertical. The first cam surface (214) is set substantially 63° to the vertical and the second cam surface (216) is set at substantially 26° to the vertical. However it will be appreciated that the exact degree of angular difference to the vertical is not an essential element of the present invention save that there is a significant difference between the two relative angles of both cam surfaces. In particular, the angle range of the first cam surface (214) may be between 50° and 70° whereas the angle of the second cam surface (216) may be between 15 and 40°.

In practice, the two free ends of the spring member (202) are one each received in the two opposed rebates (210) of the release button (208). In the tool body clam shells, the button (208) is restrained by moulded ribs (219) on each of the clam shells from lateral displacement relative to the tool axis. However, the button itself is received within a vertical recess within the clam shell allowing the button to be moveable vertically when viewed in FIG. 5 into and out of the clam shell. The clam shell further comprises a lower rib member (227) against which the base (203) of the U-shaped spring member (202) abuts. Engagement of the free ends of the spring member (202) with the cam surfaces of the rebates (210) of the release button (208) serve to resiliently bias the button in an unactuated position whereby the upper surface of the button (208) projects slightly through an aperture in the clam shell of corresponding dimension. The button (208) further incorporates a shoulder member (211) extending about the periphery of the button which engages with an inner lip (not shown) of the body clam shell to restrain the button from being displaced vertically out of the clam shell.

In operation, depression of the button member (208) effects cam engagement between the upper shoulder members (230) of the U-shaped spring with the inner cam faces (212) of the button rebates (210). Spring member (202) is prevented from being displaced vertically downwards by depression of the button by the internal rib member (217) upon which it sits. Furthermore, since the button member (208) is restrained from any lateral displacement relative to the clam shell by means of internal ribs, then any depressive force applied to the button is symmetrically transmitted to each of the arm members by the symmetrically placed rebates (210). As the first cam surface (216) engages with the shoulder of the U-shaped spring members the angle of incidence between the spring member and the cam surface is relatively low (27°) requiring a relatively high initial force to be transmitted through this cam engagement to effect cam displacement of the spring member (against the spring bias) along the cam surface (216) as the button is depressed. This cam engagement between the spring member (202) and the first cam (216) surface effectively displaces the two arms of the spring member away from each other. Continued depression of the button (208) will eventually cause the shoulders (230) of the arms of the spring member to move into engagement with the second cam surface (214) whereby the angle of incidence with this steeper cam surface is significantly increased (64°) whereby less force is subsequently required to continue cam displacement of the spring member along the second cam surface (216).

Wherein the first cam surface (216) provides for low mechanical advantage, but in return provides for relatively high dispersion of the arms of the spring member for very little displacement of the button, when the spring arms engage with the second cam surfaces (216) a high mechanical advantage is enjoyed due to the high angle of incidence of the cam surface with the spring member. In use, the user will be applying a significantly high force to the button when engaging with the first cam surface but, when the second cam surface is engaged the end user continues to apply a high depressive force to the button resulting in rapid displacement of the spring member along the second cam surface (216). The result of which is that continued downward displacement of the button is very rapid until a downwardly extending shoulder (217) of the button abuts with a restrictive clam shell rib (221) to define the maximum downward displacement of the button. Effectively, the use of these two cam surfaces in the orientation described above provides both a tactile and audible feedback to the user to indicate when full displacement of the button has been achieved. By continuing the large depressive force on the button when the second cam surface is engaged results in extremely rapid downward depression of the button as the spring relatively easily follows the second cam surface resulting in a significant increase in the speed of depression of the button until it abuts the downward limiting rib of the clam shell. This engagement of the button with the clam shell rib (221) provides an audible "click" clearly indicating to the end user that full depression has been achieved. In addition, as the button appears to snap downward as the spring member transgresses from the first to second cam surfaces this provides a second, tactile, indication to the user that full depression has been achieved. Thus, the spring mechanism (200) provides a basically digital two-step depression function to provide feedback to the user that full depression and thus spreading of the retaining spring (202) has been achieved. As such, an end user will not be confused into believing that full depression has been achieved and thereby try to remove a tool head before the spring member has been spread sufficiently.

The particular design of the spring mechanism (200) has two additional benefits. Firstly, the dual gradient of the two cam surfaces (214 and 216) provides additional mechanical advantage as the button is depressed, whereby as the arms of the spring member are displaced apart the resistance to further displacement will increase. Therefore the use of a second gradient increases the mechanical advantage of the cam displacement to compensate for this increase in spring force.

Furthermore, it will be appreciated that the dimensions of the spring to operate in retaining a tool head within the body are required to be very accurate which is difficult to achieve in the manufacture of springs of this type. It is desired that the two arms of the spring member in the unactuated position are held a predetermined distance apart to allow passage of the tool head into the body of the tool whereby cam members on the tool head will then engage and splay the arms of the spring members apart automatically as the head is introduced, and for those spring members to spring back and engage with shoulders on the spigots to effect snap engagement. This operation will be described in more detail subsequently.

However, if the arms of the spring member are too far apart then they may not return to a closed neutral position sufficient to effect retention of the tool head. If the arms are too close together then they may not receive the cam members on the tool head or make it difficult to receive such cam members to automatically splay the spring member. Therefore, in order that the tolerance of the spring member may be relaxed during manufacture, two additional flat surfaces (230) of the button (FIG. 7*b*) are utilised to engage the inner faces of the two arms (at 290) of the spring member to retain those arms at a correctly predetermined distance so as to effect maximum mechanical engagement with the spigot of the tool head.

To co-operate with the spring member (200), the second spigot (96) of the interface (90) further comprises two diametrically opposed rebates (239) in its outer radial surface for co-operating engagement with the arms (201) of the spring member (202) when the tool head is fully inserted into the tool body.

Referring now to FIGS. 8, 8*a*, 9 and 10*a*, the substantially cylindrical secondary spigot (96) of each interface (90) of the various tool heads comprises two diametrically opposed rebates or recesses (239) radially formed within the wall of the spigot (96). The inner surface of theses rebates (239) whilst remaining curved, are significantly flatter than the circular outer wall (241) as best seen in FIG. 8*a* showing a cross-section through lines 8—8 of FIG. 8. These surfaces (240) have a very large effective radius, significantly greater than the radius of the spigot (96). In addition, the rebates (239) have, when viewed in FIGS. 8 and 8*a*, a shoulder formed by a flat surface (247) which flats extend substantially parallel with the axis of the spigot (92).

It will be appreciated that when the two arms (201) of the spring member (202) are held, in their rest position (defined by the width between the two inner flats (230) of the button member and shown generally in FIG. 7*c* as the distance A), they are held at a distance substantially equal to the distance B shown in FIG. 8*a* between the opposed inner surfaces of the two rebates (239). In practice, once the tool head has been inserted into the tool body the rebates (239) are in alignment between the two arms of the spring member (202) so that these arms engage the rebate under the natural bias of such spring. In this position the shoulders (211) formed in the spring member engage with the corresponding shoulders (243) formed in the rebate (239). Due to the significant flattening effect of the otherwise circular spigot created by these rebates, a greater surface area of the spring member (202) will engage and abut within the rebate (239) than if simply two parallel wires were to engage with a circular rebate. Significantly more contact is effected between the spring member and the rebate by this current design.

In addition, the rebates (239) each have associated lead-in cam surfaces (250) disposed towards the outer periphery of the cylindrical spigot (96), which cam surfaces (250) extend substantially along a tangent of the spigot (96) wall and substantially project beyond the circumference of the spigot (96) as seen in FIGS. 8*b*, 9 and 10*a*. These cam surfaces (25) extend both in a direction parallel to the axis of the cylindrical spigot (96) and in a direction radially outward of the spigot wall. These cam surfaces comprise a chamfer which extends in an axial direction away from the free end of the spigot (96) radially outwardly of the axis (117) of the tool head. Finally, when viewing these cam surfaces (250) with reference to FIG. 9, it will be seen that the cam surfaces partially extends about the side wall and generally have a profile corresponding to the stepped shape of the arms of the U-shaped spring member (202). The general outer profile of the cam surfaces (250) correspond to a similar shape formed by the inner surfaces (240) of the rebates (239) and serves to overlie these rebates. In particular, the cam surfaces (250) have a substantially flat portion when viewed in FIG. 9 (257) and a substantially flattened curved portion (258) leading into a substantial flat cam surface (261) overlying the corresponding flat surface (247) of the associated rebate (239). Again it will be appreciated that the profile of these cam surfaces, when presented to the tool head correspond substantially to the profile presented by the spring member (202) with the curved portion of the cam surface (258) corresponding substantially to the shoulders (211) formed in the spring member (202) and the substantially flat cam surfaces (261), disposed symmetrically about the spigot (96), corresponding in diameter to the distance between the inner neck portions (209) and spring members (202).

In practice as the tool head (40/42) is inserted into the tool body, the cam surface (250) will engage with the arms (201) of the spring member to effect resilient displacement of these spring members under the force applied by the user in pushing the head and body together to effect cam displacement of the spring members over the cam surface (250) until the spring members engage the rebates (239), whereby they then snap engage, under the resilient biassing of the spring member, into these rebates. Since the inner surfaces of the cam surfaces (250) are substantially flat the spring member then serves to retain the tool head from axial displacement away from the body (12).

It will be appreciated that the circular aperture (60) formed in the inner surface (54) of the recess (52) of the tool body, whilst substantially circular does, in fact, comprises a profile corresponding to the cross-sectional profile presented by the spigot (96) and associated cam surfaces (250). This is to allow passage of the spigot through this aperture (60). As seen in FIG. 6, the arms of the spring member (202) (shown shaded for clarity) project inwardly of this aperture (60) so as to effect engagement with the rebates (240) on the spigot (96) of a tool head mounted on the tool body when the spring member is in an unactuated position.

Also seen in FIG. 10*a*, the outer radial surface of the spigot (96) and the associated cam surfaces (250) have a second channel (290) extending parallel with the axis (117) of the tool head. Each of these diametrically opposed rebates correspond with two moulded ribs formed on the clam shell so as to project radially into the aperture (60) in the tool body, one each disposed on either side of the body axis whereby such ribs are received within a complimentary fit within the tool head channel (290) when the spigot (96) is inserted into the tool body. These additional ribs and channels (290) serve to further effect engagement between the tool body and the tool head to retain the tool head from any form of relative rotational displacement when engaged in the tool body.

It will now be appreciated from the foregoing description that considerable mechanisms for aligning and connecting and restraining the tool head to the tool body are employed in the present invention. In particular, this provides for an accurate method of coupling together a power tool body with a power tool head to form a substantially rigid and well aligned power tool. Since power tools of this type utilise a drive mechanism having a first axis in the power tool to be aligned with an output drive mechanism on the tool head having a second axis, it is important that alignment of the tool head to the tool body is accurate to ensure alignment of the two axes of the tool head and tool body to obtain maximum efficiency. The particular construction of the power tool and tool heads of the present invention have been developed to provide an efficient method of coupling together two component parts of a power tool to obtain a unitary tool. The tool design also provides for a partially self-aligning mechanism to ensure accurate alignment between the tool head and tool body. In use, a user will firstly generally align a tool head with a tool body so that the interface (90) of the tool head and the respective profile of the flat and curved surfaces of the tool head align with the corresponding flattened curved surfaces of the tool body in the region of the recess (52). The first spigot member (92) is then generally introduced to the correspondingly shaped recess (52) wherein the substantially square shape of the spigot (92) aligns with the co-operating shape of the recess (52). In this manner, the wider remote ends of the channels (101) in the spigot (92) are substantially aligned with the narrower outwardly directed ends of the co-operating projections (101) mounted inwardly of the skirt (56) of the recess (52). Respective displacement of the head towards the body will then cause the tapered channels (100) to move into wedge engagement with the correspondingly tapered projections (101) to help align the tool head more accurately with the tool body which serves to subsequently align the second cylindrical spigot with the collar (400) of the gear reduction mechanism in the tool body which is to be received within the spigot (96). Furthermore, the internal tapered projections (105) of the spigot (96) are aligned for co-operating engagement with the correspondingly tapered rebates (410) formed on the outer surface of the collar member (400). Here it will be appreciated that the spigot (96) is received within the aperture (60) of the surface member (54) of the recess (52). In this manner, it will be appreciated that the clam shell of the tool head is coupled both directly to the clam shell of the tool body and also directly to the output drive of the tool body. Finally, continued displacement of the tool head towards the tool body will then cause the cam surfaces (250) of the spigot (96) to abut and engage with the spring member (202) whilst the teeth of the male cog (50) are received within co-operating recesses within the female cog member of the tool head, the cam surfaces on the male cog (50) serving to align these teeth with the female cog member.

As the tool head is then finally pushed into final engagement with the tool body, the chamfered cam surfaces (250) serve to deflect the arms of the spring member (202) radially outwards as the spigot (96) passes between the arms of the spring member until the arms of the spring member subsequently engage the channel (239) whereby they then snap engage behind the cam surfaces (250) to lock the tool head from axial displacement out of engagement with the tool body.

As previously discussed, to then remove the tool head from the tool body the button (208) must be displaced downwardly to splay the two arms of the spring member (202) axially apart out of the channel (239) to allow the shoulders presented by the cam surfaces (205) to then pass between the splayed spring member (202) as it is moved axially out of engagement with the drive spindle of the tool body.

When the tool heads (40 and 42) have been coupled with the main body (12) in the manner previously described, then the resultant power tool (10) will be either a drill or a circular saw dependent on the tool head. The tool is formed having a double gear reduction by way of the sequential engagement between the gear reduction mechanisms in the tool head and tool body. Furthermore, as a result of the significant engagement and alignment between the tool head and tool body by virtue of the many alignment ribs and recesses between the body and tool heads, the drive mechanisms of the motor and gear reduction mechanisms may be considered to form an integral unit as is conventional for power tools.

As seen from FIG. 10*a* and FIGS. 2 and 3, the interface (90) further comprises a substantially first linear section (91) (when viewed in profile) from which the spigot members (92 and 96) extend and a second non-linear section forming a curved profile. This profile may be best viewed in FIG. 8. The profile of the power tool body (12) at the area of intersection with the tool head corresponds and reciprocates this profile for complimentary engagement as in FIGS. 2, 3 and 4. Whilst this profile may be aesthetically pleasing, it further serves a functional purpose in providing additional support about this interface between the tool heads and tool body. To those skilled in the art, it will be appreciated that the use of a power drill requires application of a force substantially along the drive axis of the motor and drill chuck. For the current embodiment whereby there is an interface between the tool body and tool head then transmission of this force will be directly across the substantially linear interface region (91). In addition, any toroidal forces exerted by the rotational motion of the drill chuck and motor across the interface are firstly resisted by the substantially square spigot member (92) being received in a substantially square recess (52) and is further resisted by engagement between the ribs (101) on the recess (52) engaging with corresponding rebates (100) formed on the spigot (92). However, it is to be further appreciated that engagement of the curved section (95) of the interface (90) will also resist rotational displacement of the tool head relative to the tool body.

However, with regard to the power tool of a jigsaw, as shown in FIG. 3, the curved interface serves a further purpose of alleviating undue operational stresses between the tool body and tool head when used in this saw mode. When viewed in FIG. 3 the operation of the power tool as a jigsaw will result in a torque being applied to the tool head (42) as the saw is effectively pushed along the material being cut (direction D) and the resultant reaction between the saw blade and the wood attempting to displace the tool head in a direction shown generally as "E" in FIG. 3 as opposed to the force being applied to the power tool in the direction "F" as shown in FIG. 3. If a simple flat interface between the tool head and tool body were here employed then the resultant torque would create stresses effectively trying to pivot the tool head away from the tool body in the region (500) and effectively creating undue stress on the drive spindles of the various gear reduction mechanisms between the tool head and body across the interface. However, by use of the curved interface as shown in FIG. 3, a direct force from the power tool body to the power tool head to effect displacement of the power tool in the direction of cutting (D) is transmitted through this curved interface rather than relying on the engagement between the spindles of the gear mechanisms across the flat interface. Thus the curved interface helps to significantly reduce undue torque across the spindle axis of the power tool and tool head.

Additionally, the use of the additional projection member (172) on the tool head (42) (as seen in FIG. 10*a*) presents at least one flat surface substantially at right angles to the axis of rotation of the motor and drive spindle to effect transmission of a pushing force between the tool body and tool head substantially at right angles to the relative axis of the tool head and tool body. However, it will be appreciated that the degree of curvature on the curved surface of the interface may be sufficient to achieve this without the requirement of an additional projection (172).

It will be appreciated that the above description relates to a preferred embodiment of the invention only whereby many modifications and improvements to these basic concepts are conceivable to a person skilled in the art whilst still falling within the scope of the present invention.

In particular, it will be appreciated that the engagement mechanisms between the tool head and the tool body can be reversed such that the tool body may comprise the interface (90) with associated spigots (92 and 96) for engagement with a co-operating front aperture within each of the tool heads. In addition, the spring mechanism (200) may also be contained in the tool head in such a situation for co-operating engagement with the spigots thereby mounted on the tool body.

Still further, whilst the present invention has been described with reference to two particular types of tool head, namely a drill head and a saw head, it will be appreciated that other power tool heads could be equally employed utilising this conventional power tool technology. In particular, a head could be employed for achieving a sanding function whereby the head would contain a gear reduction mechanism as required with the rotary output of the gear reduction mechanism in the power tool head then driving a conventional sander using an eccentric drive as is common and well understood to those skilled in art. In addition, a screwdriving function may be desired whereby two or more subsequent gear reduction mechanisms are utilised in sequence within the tool head to significantly reduce the rotary output speed of the tool body. Again such a feature of additional gear reduction mechanisms is conventional within the field of power tools and will not be described further in any detail.

What is claimed is:

1. A method of coupling a first component part and a second component part of a power tool; the first component part having a mounting spigot with at least one channel formed therein and a generally cylindrical projection formed on the mounting spigot, the generally cylindrical projection including a side wall having a chamfered edge and wherein the side wall includes at least one channel parallel to an axis of the generally cylindrical member;

the second component part having a spigot-receiving portion including at least one rib co-operable with the at least one channel formed in the mounting spigot, and a generally cylindrical housing member co-operable with the generally cylindrical projection of the first component part, the spigot receiving portion including at least one further rib co-operable with the at least one channel in the side wall of the first component part, the second component part further including a detent, the method comprising the steps of:

aligning the at least one channel in the mounting spigot with the at least one co-operable rib on the spigot receiving portion;

coupling the housing member with the cylindrical projection;

engaging the further at least one rib of the spigot-receiving portion with the at least one channel of the side wall; and urging the chamfered edge past the detent.

2. A method according to claim 1, wherein uncoupling of the two component parts is not possible until the detent has been moved clear of the chamfered edge.

3. A method according to claim 1, wherein the at least one channel formed in the mounting spigot comprises a plurality of channels.

4. A method according to claim 1, wherein the at least one channel formed in the side wall comprises a plurality of channels.

5. A method according to claim 1, wherein the at least one rib of the spigot-receiving portion comprises a plurality of ribs.

6. A method according to claim 1, wherein the at least one further rib of the spigot-receiving portion comprises a plurality of further ribs.

7. A method according to claim 1, wherein the detent comprises a resiliently biassed spring.

8. A method according to claim 1, wherein coupling of the two components is only possible when the channels are aligned with their respective ribs.

9. A power tool comprising:

a first component part having a mounting spigot with at least one channel formed therein and a generally cylindrical projection formed on the mounting spigot, the generally cylindrical projection including a side wall having a chamfered edge and at least one channel parallel to an axis of the generally cylindrical member; and a second component part having a spigot-receiving portion including at least one rib aligned with the at least one channel formed in the mounting spigot, and a generally cylindrical housing member coupled with the generally cylindrical projection of the first component part, the spigot receiving portion including at least one further rib engaged with the at least one channel in the, side wall of the first component part, the second component part further including a detent cooperating with the chamfered edge.

10. The power tool according to claim 9, wherein the detent functions to couple the two component parts until the detent is moved clear of the chamfered edge.

11. The power tool according to claim 9, wherein the at least one channel formed in the mounting spigot comprises a plurality of channels.

12. The power tool according to claim 9, wherein the at least one channel formed in the side wall comprises a plurality of channels.

13. The power tool according to claim 9, wherein the at least one rib of the spigot-receiving portion comprises a plurality of ribs.

14. The power tool according to claim 9, wherein the at least one further rib of the spigot-receiving portion comprises a plurality of further ribs.

15. The power tool according to claim 9, wherein the detent comprises a resiliently biased spring.

16. The power tool according to claim 9, wherein the two components are configured to permit coupling only when the channels are aligned with their respective ribs.

* * * * *